(12) United States Patent
Imamura et al.

(10) Patent No.: US 11,420,173 B2
(45) Date of Patent: Aug. 23, 2022

(54) REACTION ANALYSIS DEVICE, REACTION ANALYSIS SYSTEM, AND REACTION ANALYSIS METHOD

(71) Applicant: Yokogawa Electric Corporation, Tokyo (JP)

(72) Inventors: Yusuke Imamura, Tokyo (JP); Yuma Otake, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 17/207,824

(22) Filed: Mar. 22, 2021

(65) Prior Publication Data

US 2021/0299628 A1 Sep. 30, 2021

(30) Foreign Application Priority Data

Mar. 31, 2020 (JP) .............................. JP2020-064956
Oct. 23, 2020 (JP) .............................. JP2020-178237

(51) Int. Cl.
*B01J 19/00* (2006.01)
*B01J 6/00* (2006.01)

(52) U.S. Cl.
CPC .............. *B01J 19/0013* (2013.01); *B01J 6/00* (2013.01); *B01J 19/0066* (2013.01); *B01J 2219/00063* (2013.01); *B01J 2219/00934* (2013.01); *B01J 2219/00959* (2013.01); *B01J 2219/2422* (2013.01)

(58) Field of Classification Search
CPC ................ B01J 19/0013; B01J 19/0006; B01J 2219/00063; B01J 2219/00934; B01J 2219/00959; B01J 2219/00961; B01J 2219/2422
See application file for complete search history.

(56) References Cited

U.S. PATENT DOCUMENTS 4,236,219 A * 11/1980 Killebrew, Jr. ...... C10G 49/005
700/271
4,668,473 A * 5/1987 Agarwal ................ B01J 19/002
422/109
2015/0168234 A1 6/2015 Murakami
2018/0326393 A1 * 11/2018 Andreoli ............. B01J 19/2465

FOREIGN PATENT DOCUMENTS

| EP | 1 586 373 A1 | 10/2005 |
|---|---|---|
| EP | 3 851 819 A1 | 7/2021 |
| JP | 2020-011948 A | 1/2020 |
| WO | 01/02843 A1 | 1/2001 |
| WO | 2012/097221 A1 | 7/2012 |
| WO | 2020/054785 A1 | 3/2020 |

OTHER PUBLICATIONS

Cindy Hany et al., "A millifluidic calorimeter with infrared thermography for the measurement of chemical reaction enthalpy and kinetics", QIRT Journal, 2008, vol. 5, No. 2, pp. 211-229 (20 pages total).

* cited by examiner

*Primary Examiner* — Lessanework Seifu
(74) *Attorney, Agent, or Firm* — Sughrue Mion, PLLC

(57) ABSTRACT

A reaction analysis device specifies a reaction state of a reaction fluid flowing through a flow reactor. The reaction analysis device includes a processor configured to specify the reaction state of the reaction fluid based on a reaction parameter indicating the reaction state of the reaction fluid which is obtained from a temperature distribution of the reaction fluid immediately after a reaction starts in a flow direction of the reaction fluid.

16 Claims, 12 Drawing Sheets

REACTION ANALYSIS DEVICE, REACTION ANALYSIS SYSTEM, AND REACTION ANALYSIS METHOD

BACKGROUND

Technical Fields

The present invention relates to a reaction analysis device, a reaction analysis system, and a reaction analysis method.

Priority is claimed on Japanese Patent Application No. 2020-064956, filed on Mar. 31, 2020, and Japanese Patent Application No. 2020-178237, filed on Oct. 23, 2020, the contents of which are incorporated herein by reference.

Description of Related Art

When medical supplies or fine chemical materials are produced using organic chemical reactions, it is important to optimize reaction conditions in order to improve the efficiency of production. Examples of the reaction conditions include selection of solvent species or reagents, concentration, temperature, reaction time, and the like. In an optimization process, conditions in which a high yield can be obtained are searched for in order to improve efficiency. In the optimization process, items are optimized in order, and a yield or a reaction rate measured by sampling the concentration of a product in a reaction time is mainly used as the index. Meanwhile, in product synthesis, for example, a flow reactor in which a first solution and a second solution are injected into a supply device and mixed and synthesized with a mixer is used (see, for example, Japanese Unexamined Patent Application Publication No. 2020-11948).

However, the related art requires a process of sampling a reaction fluid in a certain reaction time in order to obtain a reaction rate from an experiment and performing extraction, concentration measurement, or the like of a product with respect to the sampled reaction fluid, and requires at least several hours of working to calculate the concentration under one condition. In the related art, it is necessary to repeat a trial and error process of performing a condition change and extraction several tens of times or more depending on the number of optimization items. In addition, the related art requires concentration data under a plurality of temperature conditions, and thus requires more man-hours.

SUMMARY

A reaction analysis device may specify a reaction state of a reaction fluid flowing through a flow reactor. The reaction analysis device may include a processor configured to specify the reaction state of the reaction fluid based on a reaction parameter indicating the reaction state of the reaction fluid which is obtained from a temperature distribution of the reaction fluid immediately after a reaction starts in a flow direction of the reaction fluid.

Further features and aspects of the present disclosure will become apparent from the following detailed description of exemplary embodiments with reference to the attached drawings.

DESCRIPTION OF EMBODIMENTS

Figure 1:
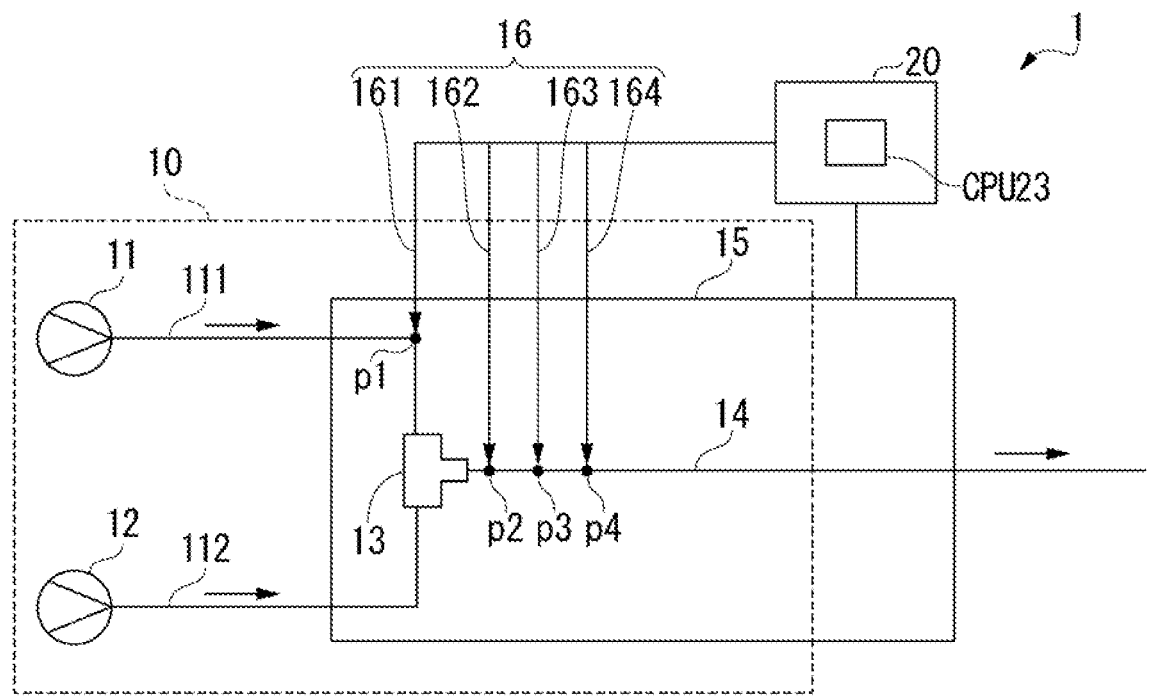
FIG. 1 is a block diagram illustrating a configuration example of a reaction analysis system according to a first embodiment.

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a reaction analysis device, a reaction analysis system, and a reaction analysis method that make it possible to detect a reaction state such as a reaction rate in a shorter time than before without carrying out a plurality of experiments.

Hereinafter, embodiments of the present invention will be described with reference to the accompanying drawings. Meanwhile, in the drawings used in the following description, the scale of each member is appropriately changed in order to make each member recognizable.

First Embodiment

First, a first embodiment of the present invention will be described.

<Configuration of Reaction Analysis System 1>

FIG. 1 is a block diagram illustrating a configuration example of a reaction analysis system 1 according to the first embodiment. As shown in FIG. 1, the reaction analysis system 1 includes a first pump 11, a liquid feeding tube 111, a second pump 12, a liquid feeding tube 112, a mixer 13, a reaction tube 14 (reaction flow path), a temperature regulator 15, a temperature measurer 16, and a reaction analysis device 20. The temperature measurer 16 includes a first temperature measurer 161 (temperature measurer), a second temperature measurer 162 (temperature measurer), a third temperature measurer 163 (temperature measurer), and a fourth temperature measurer 164 (temperature measurer). A flow reactor 10 includes the first pump 11, the liquid feeding tube 111, the second pump 12, the liquid feeding tube 112, the mixer 13, and the reaction tube 14. The reaction analysis device 20 includes a CPU 23 (processor).

The flow reactor 10 shown in FIG. 1 includes a plurality of supply flow paths (the first pump 11 and the liquid feeding tube 111, the second pump 12 and the liquid feeding tube 112) that supply each of a plurality of reactants supplied to a chemical reaction, and the mixer 13 which is connected to the plurality of supply flow paths to mix the plurality of reactants, and is formed in a flow path shape.

The first pump 11 is connected to a first introduction port of the mixer 13 through the liquid feeding tube 111. The second pump 12 is connected to a second introduction port of the mixer 13 through the liquid feeding tube 112. The mixer 13 includes two introduction ports and one discharge port. The discharge port of the mixer 13 is connected to the reaction tube (reaction flow path) 14 through which a reaction fluid obtained by mixing a plurality of reactants flows.

The temperature measurer 16 includes the first temperature measurer 161, the second temperature measurer 162, the third temperature measurer 163, and the fourth temperature measurer 164 which are disposed along the flow path, for example, in front of and behind the mixer 13 so that the temperature of a reaction fluid at a plurality of positions along the reaction tube 14 can be measured.

The first temperature measurer 161 is installed on the input side of the mixer 13, and the first temperature measurer 161 can measure (estimate) the initial temperature of a reaction fluid obtained by mixing a plurality of reactants (the temperature of a reaction fluid at the discharge port of the mixer 13).

The second temperature measurer 162, the third temperature measurer 163, and the fourth temperature measurer 164 are installed in the reaction tube 14 on the output side of the mixer 13, and the second temperature measurer 162 to the fourth temperature measurer 164 can measure the temperature (temperature distribution) of the reaction fluid immediately after mixing (immediately after a reaction starts) in the flow direction of the reaction fluid. Meanwhile, the wording "immediately after a reaction starts" does not mean immediately after a reaction fluid actually starts reacting, but means immediately after the reaction fluid is placed in a state in which the reaction is started (in the first embodiment, immediately after a plurality of reactants are mixed).

The liquid feeding tube 111, the liquid feeding tube 112, the mixer 13, and the reaction tube 14 are installed within the temperature regulator 15.

<Operation of Reaction Analysis System 1 (Reaction Analysis Method)>

The reaction analysis system 1 is used for specifying the reaction state of a reaction fluid in a flow synthesis-type chemical reaction device. The reaction analysis system 1 measures a temperature before reaction and temperatures at a plurality of locations after reaction, and estimates reaction parameters on the basis of the measured temperatures. Reactants injected into the first pump 11 and the second pump 12 may be liquid or gas. The reaction parameters indicate the reaction state of a reaction fluid, and are parameters that influence, for example, the temperature distribution of a chemical reaction field as will be described later. A product generated by the reaction analysis system 1 is, for example, a peptide compound.

A first reactant A is injected into the first pump 11. The first pump 11 supplies the injected first reactant A to the mixer 13 through the liquid feeding tube 111 (first flow path), for example, at a first flow velocity and a first flow rate.

A second reactant B is injected into the second pump 12. The second pump 12 supplies the injected second reactant B to the mixer 13 through the liquid feeding tube 112 (second flow path), for example, at a second flow velocity and a second flow rate.

The mixer 13 mixes the first reactant A supplied from the first pump 11 with the second reactant B supplied from the second pump 12, and supplies a mixed product to the reaction tube 14.

The reaction tube 14 is supplied with the product from the discharge port of the mixer 13. In the space inside the mixer 13, mixing of the first reactant A with the second reactant B is started. In the flow reactor, reaction occurs from the inside of the mixer 13 to the inside of the reaction tube 14, and, for example, a solution containing a product moves within the reaction tube 14. In the flow reactor, for example, a solution containing a product is discharged to the outside of the reaction tube 14 through the reaction tube 14.

The temperature regulator 15 is, for example, a constant temperature water bath, and adjusts the temperatures of the mixer 13 and the reaction tube 14 to predetermined temperatures in accordance with control of the reaction analysis device 20.

The temperature measurer 16 is a sensor that measures the temperature of a chemical reaction field, and is, for example, a thermocouple. The temperature measurer 16 may be a contactless, for example, optical temperature sensor. The temperature measurer 16 detects the temperature distribution of a reaction fluid along the reaction tube 14 (reaction flow path), and outputs temperature information (actual measured temperature distribution) indicating the detected temperature to the reaction analysis device 20. Meanwhile, the chemical reaction field is a region in which chemical reaction of mixed reactants occurs on the downstream side of the mixer.

The first temperature measurer 161 is installed at a position p1 before reaction. Meanwhile, the installation location may be at least one of the first pump 11 side and the second pump 12 side, or may be both the first pump 11 side and the second pump 12 side. In a case where the first temperature measurer 161 is installed on both the first pump 11 side and the second pump 12 side, an average value of the temperature on the first pump 11 side and the temperature on the second pump 12 side may be output to the reaction analysis device 20. Meanwhile, the average value may be calculated by the reaction analysis device 20. Meanwhile, it is not necessarily essential to measure the temperature of the mixer on the upstream side. For example, the first temperature measurer 161 is not required in a case where the temperature of a reactant is kept constant.

The second temperature measurer 162 is installed at a position p2 after reaction. The position p2 is a position closest to the discharge port of the mixer 13 among positions p2 to p4. The second temperature measurer 162 measures the temperature at the position p2, and outputs information indicating the measured temperature to the reaction analysis device 20.

The third temperature measurer 163 is installed at the position p3 after reaction. The position p3 is a position between the position p2 and the position p4, and is longer in distance from the discharge port of the mixer 13 than the position p2. The third temperature measurer 163 measures the temperature at the position p3, and outputs information indicating the measured temperature to the reaction analysis device 20.

The fourth temperature measurer 164 is installed at the position p4 after reaction. The position p4 is a position farthest from the discharge port of the mixer 13 among the positions p2 to p4. The fourth temperature measurer 164 measures the temperature at the position p4, and outputs information indicating the measured temperature to the reaction analysis device 20.

The reaction analysis device 20 controls the temperature regulator 15. The reaction analysis device 20 control the flow rates of the first pump 11 and the second pump 12. The reaction analysis device 20 acquires information indicating the measured temperature which is output by the temperature measurer 16. The reaction analysis device 20 uses the acquired information indicating the temperature to specify the reaction state of a reaction fluid obtained by mixing a plurality of reactants. The reaction state is, for example, the reaction rate of a reaction fluid, the concentrations of a plurality of reactants, or the concentration or yield of a product contained in the reaction fluid. The reaction analysis device 20 analyzes the reaction, for example, by estimating a function of a position and a temperature. Meanwhile, an estimation method or the like will be described later.

Meanwhile, the configuration shown in FIG. 1 is an example, and the present invention is not limited thereto. For example, a first product may be generated by mixing the first reactant with the second reactant in a first mixer, and a second product may be generated by mixing this first product with a third reactant in a second mixer. In this case, the temperature measurer is installed in front of and behind (upstream and downstream of) the first mixer or only downstream thereof, and the temperature measurer is installed in front of and behind (upstream and downstream of) the second mixer or only downstream thereof, so that the temperature distribution of a reaction fluid immediately after the first mixer mixes the first reactant with the second reactant may be detected, and the temperature distribution of a reaction fluid immediately after the second mixer mixes the first product with the third reactant may be detected.

<Example of Temperature Distribution>

Next, an example of a relationship between a position x and a temperature will be described.

Figure 2:
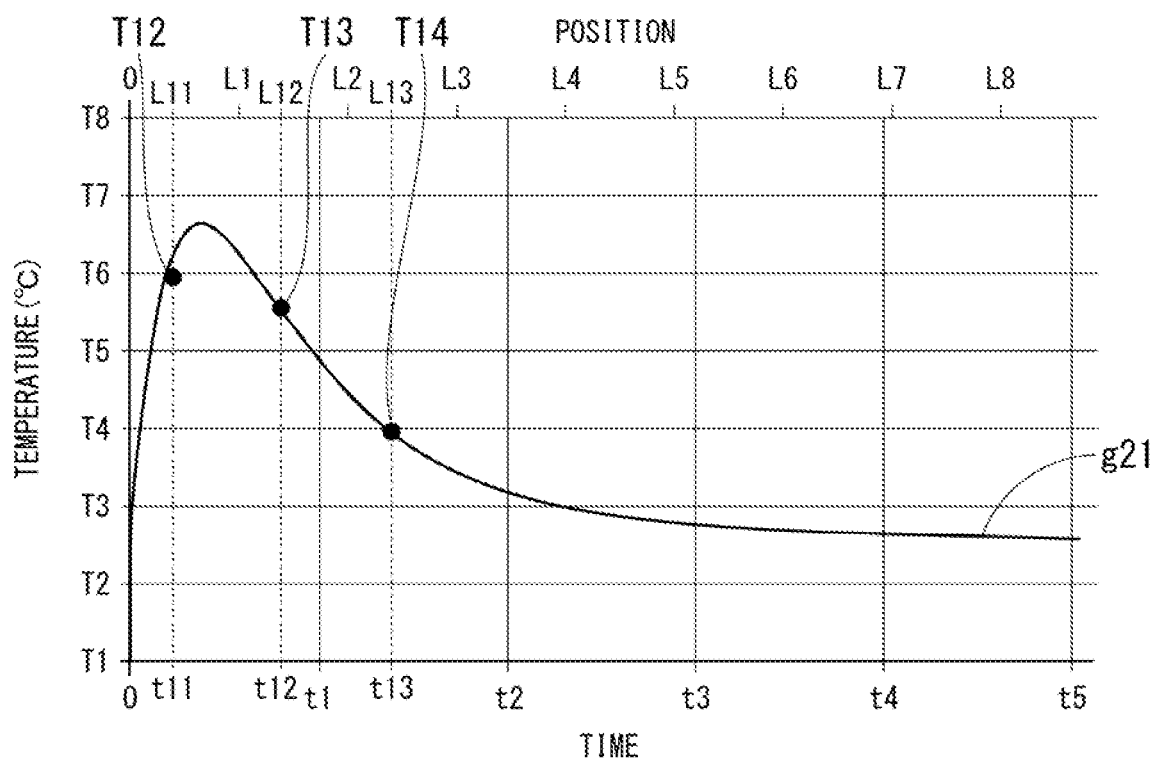
FIG. 2 is a diagram illustrating a relationship between a position and a temperature, and a relationship between a time and a temperature.

FIG. 2 is a diagram illustrating a relationship between a position and a temperature and a relationship between a time and a temperature, and specifically the temperature distribution of a reaction fluid with respect to a flow path distance from the mixer 13 in the reaction tube 14 and the temperature distribution of a reaction fluid with respect to an elapsed time (reaction time) after mixing performed by the mixer 13. In FIG. 2, the lower horizontal axis is a time, the upper horizontal axis is a position, and the vertical axis is a temperature (° C.).

A curve g21 is a curve indicating an actual measured temperature distribution which is obtained by the temperature measurer 16 in a case where the first reactant A and the second reactant B are mixed in the flow reactor 10. In this case, the actual measured temperature after approximately t11 of the reaction (at the position of L11 from discharge port of the mixer 13) is T12, the actual measured temperature after t12 of the reaction (at the position of L12 from the discharge port of the mixer 13) is T13, and the actual measured temperature after t13 of the reaction (at the position of L13 from the discharge port of the mixer 13) is T14. Regarding reaction parameters in a case where the first reactant A and the second reactant B are mixed, $\Delta H$ (a first reaction parameter) is, for example, 180 kJ/mol, and $\Delta G^{\ddagger}$ (a second reaction parameter) is, for example, 74 kJ/mol. Meanwhile, the reaction parameters $\Delta H$ and $\Delta G^{\ddagger}$ will be described later.

Here, the position of installation of the temperature measurer 16 will be described.

The first temperature measurer 161 of the temperature measurer 16 is installed at a position before reaction (p1 in FIG. 1). The second temperature measurer 162 to the fourth temperature measurer 164 are installed at positions after reaction (p2 to p4 in FIG. 1). As shown in FIG. 2, the positions at which the second temperature measurer 162 to the fourth temperature measurer 164 are installed are preferably locations at which a change in the temperature of a reaction fluid immediately after reaction caused by heat of the reaction between the first reactant A and the second reactant B is captured. The wording "change in the temperature of a reaction fluid immediately after reaction" refers to a change in temperature in a short time such as the maximum value of a change in temperature. Since the concentration of a reactant is highest immediately after reaction, the reaction rate is high and the amount of heat generation per unit time is large, and thus a change in temperature in a short time is likely to occur. In addition, the wording "locations at which a change in the temperature of a reaction fluid immediately after reaction are captured" refers to disposition locations with the peak position of a change in temperature (flow path distance from the mixer 13 having a maximum value or position of an elapsed time after mixing) interposed therebetween, and includes at least a location at which temperature rises toward the peak value (temperature value of a maximum value) of a change in temperature and a location at which temperature drops from the peak value of a change in temperature.

Therefore, in a case where the position of a maximum value is L4, the second temperature measurer 162 to the fourth temperature measurer 164 are installed at positions where a change in the maximum value of this position is captured, for example, the positions of L3, L5, and L6.

Meanwhile, in a case where the time or position at which the maximum value occurs is not clear, for example, three or more temperature measurers 16 may be installed after reaction. The reaction analysis device 20 may select a temperature measurer 16 at a location where a change in temperature immediately after reaction is captured on the basis of the measured temperature.

<Method of Calculating Reaction Parameter from Temperature Distribution of Reaction Field>

Next, a method of calculating a reaction parameter from the temperature distribution of a reaction field will be described.

Figure 3:
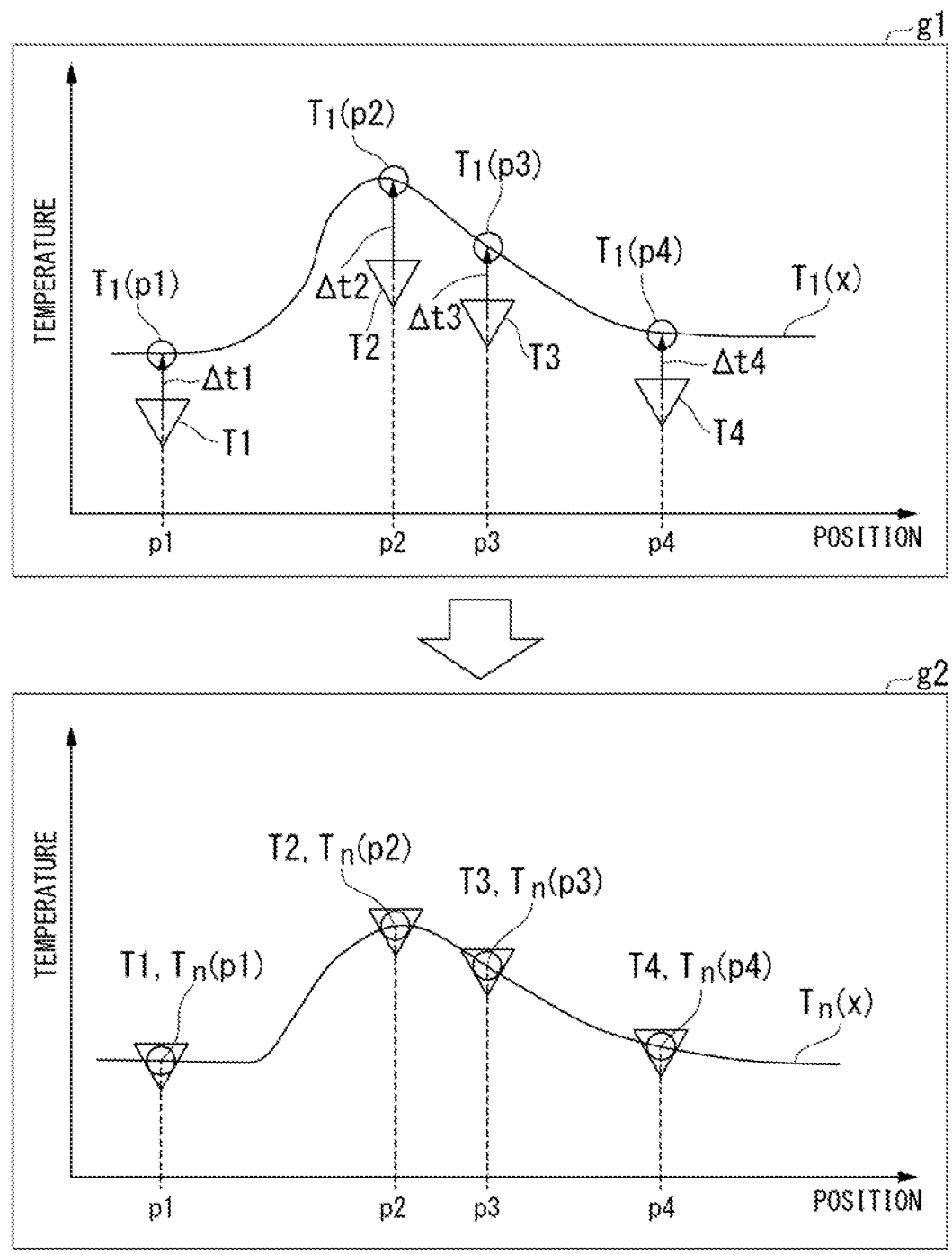
FIG. 3 is a diagram illustrating a method of calculating a reaction parameter from the temperature distribution of a reaction field according to the first embodiment.

FIG. 3 is a diagram illustrating a method of calculating a reaction parameter from the temperature distribution of a reaction field according to the first embodiment. The drawing of a region indicated by the sign g1 is a temperature distribution example before parameter adjustment or during parameter adjustment. In the drawing of the region indicated by the sign g1, the horizontal axis is a position, and the vertical axis is a temperature.

An actual measured value T1 is a temperature at the position p1. An actual measured value T2 is a temperature at the position p2. An actual measured value T3 is a temperature at the position p3. An actual measured value T4 is a temperature at the position p4.

A function $T_1(x)$ is a solution of a governing equation for estimating the temperature distribution of a reaction fluid immediately after mixing, and is a function of a temperature with respect to the position x.

An estimated value $T_1(p1)$ is an estimated value of a temperature at the position p1 based on the function $T_1(x)$. An estimated value $T_1(p2)$ is an estimated value of a temperature at the position p2 based on the function $T_1(x)$. An estimated value $T_1(p3)$ is an estimated value of a temperature at the position p3 based on the function $T_1(x)$. An estimated value $T_1(p4)$ is an estimated value of a temperature at the position p4 based on the function $T_1(x)$.

That is, the drawing of the region indicated by the sign g1 (graph of the function $T_1(x)$) in FIG. 3 shows an estimated temperature distribution which is obtained by estimating the temperature distribution of a reaction fluid immediately after mixing.

$\Delta t1$ is a difference between the estimated value $T_1(p1)$ and the actual measured value $T_1$ at the position p1. $\Delta t2$ is a difference between the estimated value $T_1(p2)$ and the actual measured value T2 at the position p2. $\Delta t3$ is a difference between the estimated value $T_1(p3)$ and the actual measured value T3 at the position p3. $\Delta t4$ is a difference between the estimated value $T_1(p4)$ and the actual measured value T4 at the position p4.

That is, when the actual measurement result (here, actual measured temperature distribution) obtained by measuring the temperature of a reaction fluid is compared with the estimated temperature distribution obtained by estimating the temperature distribution of a reaction fluid immediately after mixing, the used function $T_1(x)$ is not appropriate in the example shown in the region indicated by the sign g1, and thus a great difference occurs between the estimated value and the actual measured value.

A drawing of a region indicated by a sign g2 is a temperature distribution example after parameter adjustment. In the drawing of the region indicated by the sign g2, the horizontal axis is a position, and the vertical axis is a temperature.

A function $T_n(x)$ is a solution of a governing equation for estimating the temperature distribution of a reaction fluid immediately after mixing, and is a function of a temperature with respect to the position x.

An estimated value $T_n(p1)$ is an estimated value of a temperature at the position p1 based on the function $T_n(x)$. An estimated value $T_n(p2)$ is an estimated value of a temperature at the position p2 based on the function $T_n(x)$. An estimated value $T_n(p3)$ is an estimated value of a temperature at the position p3 based on the function $T_n(x)$. An estimated value $T_n(p4)$ is an estimated value of a temperature at the position p4 based on the function $T_n(x)$.

That is, the drawing of the region indicated by the sign g1 in FIG. 3 (graph of the function $T_n(x)$) shows an estimated temperature distribution which is obtained by estimating the temperature distribution of a reaction fluid immediately after mixing.

In the drawing of the region indicated by the sign g1 (graph of the function $T_n(x)$) in FIG. 3, $\Delta t1$ which is a difference between the estimated value $T_n(p1)$ and the actual measured value $T_1$ at the position p1, $\Delta t2$ which is a difference between the estimated value $T_n(p2)$ and the actual measured value T2 at the position p2, $\Delta t3$ which is a difference between the estimated value $T_n(p3)$ and the actual measured value T3 at the position p3, and $\Delta t4$ which is a difference between the estimated value $T_n(p4)$ and the actual measured value T4 at the position p4 are minute with a predetermined value and thus are not shown in the drawing.

That is, when the actual measured temperature distribution obtained by measuring the temperature of a reaction fluid is compared with the estimated temperature distribution obtained by estimating the temperature distribution of a reaction fluid immediately after mixing, the used function $T_n(x)$ is appropriate in the example shown in the region indicated by the sign g2, and thus a difference between the estimated value and the actual measured value is within a predetermined value. In the first embodiment, a difference between the estimated value and the actual measured value being within a predetermined value is regarded as the actual measured value and the function $T_n(x)$ coinciding with each other.

In the first embodiment, a reaction parameter is set in which a difference between the actual measured value of the temperature of a reaction fluid at each temperature measurement position (equivalent to each position x) of the temperature measurer 16 (the second temperature measurer 162 to the fourth temperature measurer 164) and the estimated value of the temperature of a reaction fluid at each position x based on the function $T_n(x)$ is within a predetermined value.

Here, the reaction parameter and the function $T_n(x)$ will be described.

The function $T_n(x)$ is a solution of a governing equation for estimating the temperature distribution of a reaction fluid immediately after mixing, and is a function of the position x and the reaction parameters $\Delta H$ and $\Delta G^{\ddagger}$ as in the following Expression (1).

$$T_n(x) \approx f(x, \Delta H, \Delta G^{\ddagger}) \ldots \qquad (1)$$

Alternatively, the function $T_n(x)$ is a function of the position x and reaction parameters $\Delta H$ and $E_a$ as in the following Expression (2).

$$T_n(x) \approx f(x, \Delta H, E_a) \ldots \qquad (2)$$

The reaction parameter $\Delta H$ is a reaction molar enthalpy (kJ/mol). The reaction molar enthalpy is an amount indicating heat of reaction per mole (per unit substance amount). The reaction parameter $\Delta H$ is relevant to the maximum value in the graph of FIG. 3 of the relationship between a position and a temperature, that is, the peak value of the temperature distribution of a reaction fluid immediately after mixing.

The reaction parameter $\Delta G^{\ddagger}$ is activation free energy (kJ/mol). The activation free energy is a difference between free energy before reaction and free energy in a reaction transition state, and indicates the temperature dependency of a reaction rate. The reaction parameter $\Delta G^{\ddagger}$ is relevant to the peak value and peak position of the temperature distribution of a reaction fluid immediately after mixing.

The reaction parameter $E_a$ is activation energy (kJ/mol). The activation energy is a parameter of an Arrhenius' equation indicating a relationship between a reaction rate and a temperature, or a difference between energy before reaction and energy in a reaction transition state, and indicates the temperature dependency of a reaction rate. The reaction parameter $E_a$ is relevant to the peak value and peak position of the temperature distribution of a reaction fluid immediately after mixing.

In addition, in the following description, the actual measured value (temperature distribution measurement value) $T_0(x)$ of a temperature is represented by the following Expression (3).

$$T_0(x)=(T1,T2,T3,T4) \qquad (3)$$

Next, a processing procedure example of a reaction analysis in the reaction analysis system 1 will be described.

Figure 4:
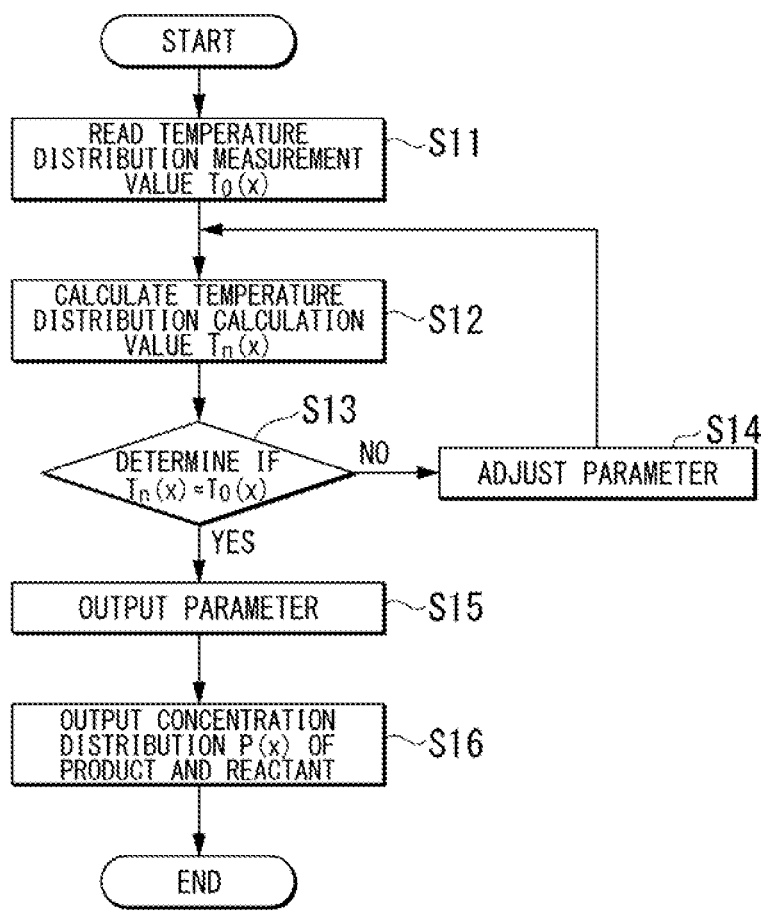
FIG. 4 is a processing procedure of a reaction analysis according to the first embodiment, and is a flowchart for specifying the reaction state of a reaction fluid on the basis of the temperature distribution of the reaction fluid immediately after mixing in the flow direction of the reaction fluid.

FIG. 4 is a processing procedure of a reaction analysis according to the first embodiment, and is a flowchart for specifying the reaction state of a reaction fluid on the basis of the temperature distribution of the reaction fluid immediately after mixing in the flow direction of the reaction fluid. Meanwhile, in the following process, a case where the reaction parameters are $\Delta H$ and $\Delta G^\ddagger$ will be described.

(Step S11) The reaction analysis device 20 acquires information relating to a temperature measured by the temperature measurer 16 (actual measured temperature distribution which is obtained by measuring the temperature of a reaction fluid). Thereby, the reaction analysis device 20 reads the temperature distribution measurement value $T_0(x)$. Meanwhile, the reaction analysis device 20 stores the positions x (p1 to p4 in FIG. 1) at which the temperature measurers 16 are installed.

(Step S12) The reaction analysis device 20 temporarily sets the reaction parameters $\Delta Hn$ and $\Delta G^\ddagger_n$ to calculate the temperature distribution calculation value $T_n(x)$ (acquire an estimated temperature distribution which is obtained by estimating the temperature distribution of a reaction fluid immediately after mixing). Meanwhile, in a case where the process of step S12 is performed one time, the reaction analysis device 20 sets the reaction parameters $\Delta H_1$ and $\Delta G^\ddagger_1$ to, for example, initial values stored by its own unit to calculate the temperature distribution calculation value $T_1(x)$.

(Step S13) The reaction analysis device 20 calculates a difference $\Delta tm$ between a temperature estimated value at each position pm (m is, for example, an integer between 1 and 4) which is estimated by the function $T_n(x)$ and a temperature actual measured value Tm at each position pm which is actually measured by the temperature measurer 16 (compares the actual measured temperature distribution with the estimated temperature distribution). In a case where the number of temperature measurement locations is four, the reaction analysis device 20 determines whether $T_n(x)$ approximately coincides with $T_0(x)$ by determining whether $\Delta t1(=T1-T_n(p1))$, $\Delta t2(=T2-T_n(p2))$, $\Delta t3(=T3-T_n(p3))$, and $\Delta t4(=T4-T_n(p4))$ are all within a predetermined value stored by the host device. In a case where it is determined that $T_n(x)$ approximately coincides with $T_0(x)$ (step S13; YES), the reaction analysis device 20 advances the process of step S15. In a case where it is determined that $T_n(x)$ does not approximately coincide with $T_0(x)$ (step S13; NO), the reaction analysis device 20 advances the process of step S14. Meanwhile, the predetermined value which is used for the comparison of the actual measured temperature distribution with the estimated temperature distribution may be set in common for each measurement location, or may be set for each measurement location.

(Step S14) The reaction analysis device 20 adjusts the values of the reaction parameters. For example, in a case where $\Delta t1$ to $\Delta t4$ are all positive, the reaction parameter $\Delta H$ is set to a value greater than $\Delta H_1$ so as to increase the height of the maximum value. For example, in a case where $\Delta t1$ to $\Delta t4$ are all negative, the reaction parameter $\Delta H$ is set to a value smaller than $\Delta H_1$ so as to lower the height of the maximum value. After the process, the reaction analysis device 20 returns to the process of step S12. In addition, in a case where only $\Delta t2$ is negative and the others are positive (for example, in a case where the peak position of the estimated temperature distribution is located behind the measured temperature distribution), $\Delta G^\ddagger_1$ is set to a small value so that the peak position of the estimated temperature distribution comes forward.

(Step S15) The reaction analysis device 20 outputs the reaction parameters $\Delta H$ and $\Delta G^\ddagger$.

(Step S16) The reaction analysis device 20 calculates the concentration distribution P(x) of a product and a reactant, and outputs the calculated concentration distribution P(x) of a product and a reactant.

Meanwhile, in a case where the reaction parameters are $\Delta H$ and $\Delta G^\ddagger$, the concentration distribution P(x) of a product and a reactant which is calculated and output by the reaction analysis device 20 is obtained by solving the differential equation of the following Expression (4).

$$\frac{d[P]}{dt} = \frac{k_B T}{h}[A][B]\exp\left(-\frac{\Delta G^\ddagger}{RT}\right) \qquad (4)$$

In Expression (4), [A] is the concentration of the first reactant A, [B] is the concentration of the second reactant B, h is a Planck's constant ($6.62607004 \times 10^{-34}$ (m$^2$ kg/s)), kB is a Boltzmann's constant ($1.380649 \times 10^{-23}$ (JK$^{-1}$)), R is a gas constant, T is the temperature of a fluid.

In addition, in a case where the reaction parameters are $\Delta H$ and $E_a$, the concentration distribution P(x) of a product and a reactant which is calculated and output by the reaction analysis device 20 is represented as in the following Expression (5).

$$\frac{d[P]}{dt} = [A][B]A\exp\left(-\frac{E_a}{RT}\right) \qquad (5)$$

In Expression (5), [A] is the concentration of the first reactant A, [B] is the concentration of the second reactant B, A is the frequency factor of an Arrhenius' equation, R is a gas constant, and T is the temperature of a fluid.

Figure 5:
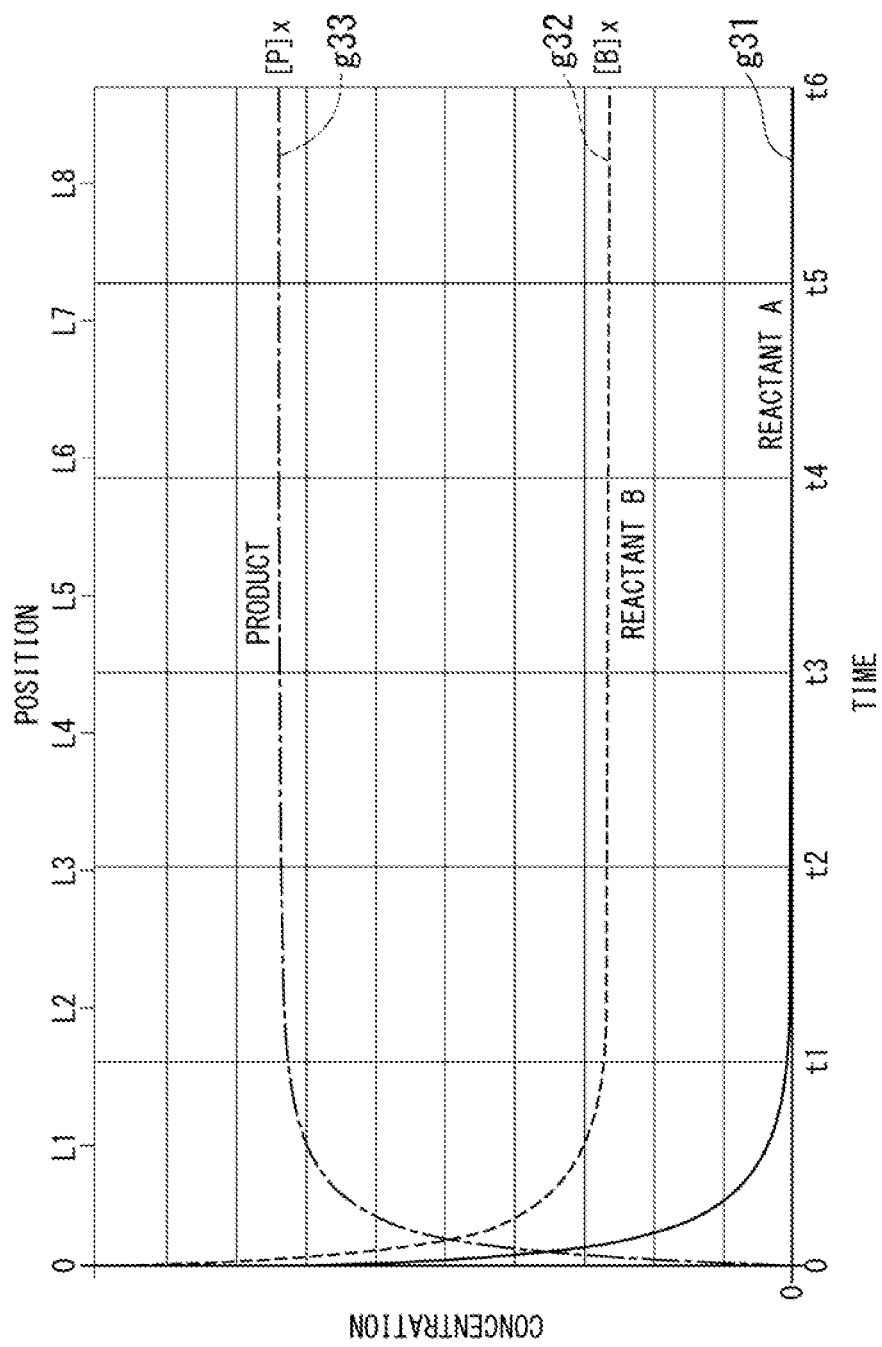
FIG. 5 is a diagram illustrating a positional change (change over time) in the concentration of a reactant and a product.

FIG. 5 is a diagram illustrating a positional change (change over time) in the concentration of a reactant and a product. In FIG. 5, the lower horizontal axis is a time, the upper horizontal axis is a position, and the vertical axis is the concentration of a reactant and a product. Meanwhile, the value of the vertical axis for the first reactant A and the second reactant B indicates the concentration of the reactants. In addition, FIG. 5 is a result example in which the reaction analysis device 20 obtains the concentration distribution P(x) of a product and a reactant using obtained reaction parameters and Expression (4) or (5) and converts the obtained concentration into a yield. Meanwhile, the yield is a ratio of yield amount to theoretical yield amount in reaction. The yield amount is an amount of a product obtained in reality. Theoretical yield amount is a maximum amount that can be theoretically obtained for a substrate or a reagent which is used.

A curve g31 is a relationship between the time and concentration of the first reactant A after mixing and a relationship between the position and concentration thereof. A curve g32 is a relationship between the time and concentration of the second reactant B after mixing and a relationship between the position and concentration thereof. A curve g33 is a relationship between the time and yield of the product after mixing and a relationship between the position and yield thereof.

In the example of FIG. 5, the concentration of the first reactant A becomes approximately 0 at t1 to t2, the concentration of the second reactant B converges to [B]x at t1 to t2, and the concentration of the product converges to [P]x at t1 to t2.

In this manner, in the first embodiment, it is possible to estimate the concentration and reaction rate of a reactant and a product at any position and at any time in the flow reactor by estimating the reaction parameters using the actual measured value.

In addition, it is possible to estimate the yield of a product at any position and at any time in the flow reactor by estimating the concentration.

<Configuration Example of Reaction Analysis Device 20>

Next, a configuration example of the reaction analysis device 20 will be described.

Figure 6:
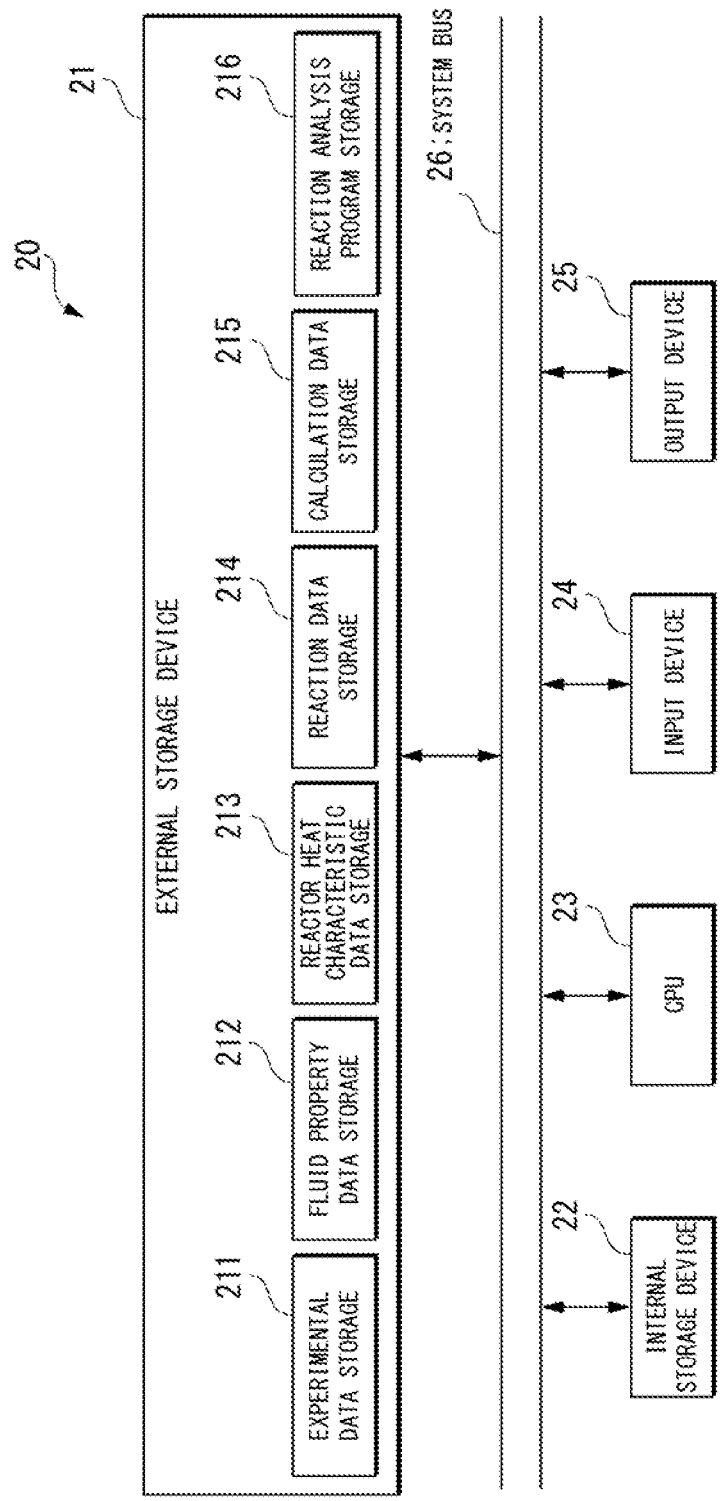
FIG. 6 is a diagram illustrating a configuration example of a reaction analysis device according to the first embodiment.

FIG. 6 is a diagram illustrating a configuration example of the reaction analysis device 20 according to the first embodiment. As shown in FIG. 6, the reaction analysis device 20 includes an external storage device 21, an internal storage device 22, the CPU 23, an input device 24, and an output device 25. The external storage device 21 includes an experimental data storage 211, a fluid property data storage 212, a reactor heat characteristic data storage 213, a reaction data storage 214, a calculation data storage 215, and a reaction analysis program storage 216.

The external storage device 21, the internal storage device 22, the CPU 23, the input device 24, and the output device 25 are connected to each other through a system bus 26.

The experimental data storage 211 stores experimental data (such as, for example, temperature actually measured by various sensors or the like). The fluid property data storage 212 stores fluid property data (such as, for example, density, specific heat, thermal conductivity, or a viscosity coefficient) as constants or variables required for an analysis. The reactor heat characteristic data storage 213 stores reactor heat characteristic data as constants or variables required for an analysis (such as, for example, thermal conductivity or specific heat of the wall surface in the flow reactor). The reaction data storage 214 stores reaction data (such as, for example, data relating to chemical reaction or a reaction parameter). The calculation data storage 215 stores calculation data (for example, various distributions such as temperature, flow velocity, or concentration solved by an expression). The reaction analysis program storage 216 stores a reaction analysis program (such as, for example, a program for solving a simulation used for the calculation of an estimated temperature distribution).

The internal storage device 22 temporarily stores data under analysis (such as, for example, reaction parameters or various distributions).

The CPU 23 is, for example, a personal computer, and performs control of the reaction analysis system 1, acquisition of data, analysis of data, or estimation.

The input device 24 is, for example, a touch panel sensor or the like provided on a keyboard, a mouse, or a display device, and is a device that detects a user's operation.

The output device 25 is an output device such as a liquid crystal display, an organic electro luminescence (EL) display device, or a printer.

Figure 7:
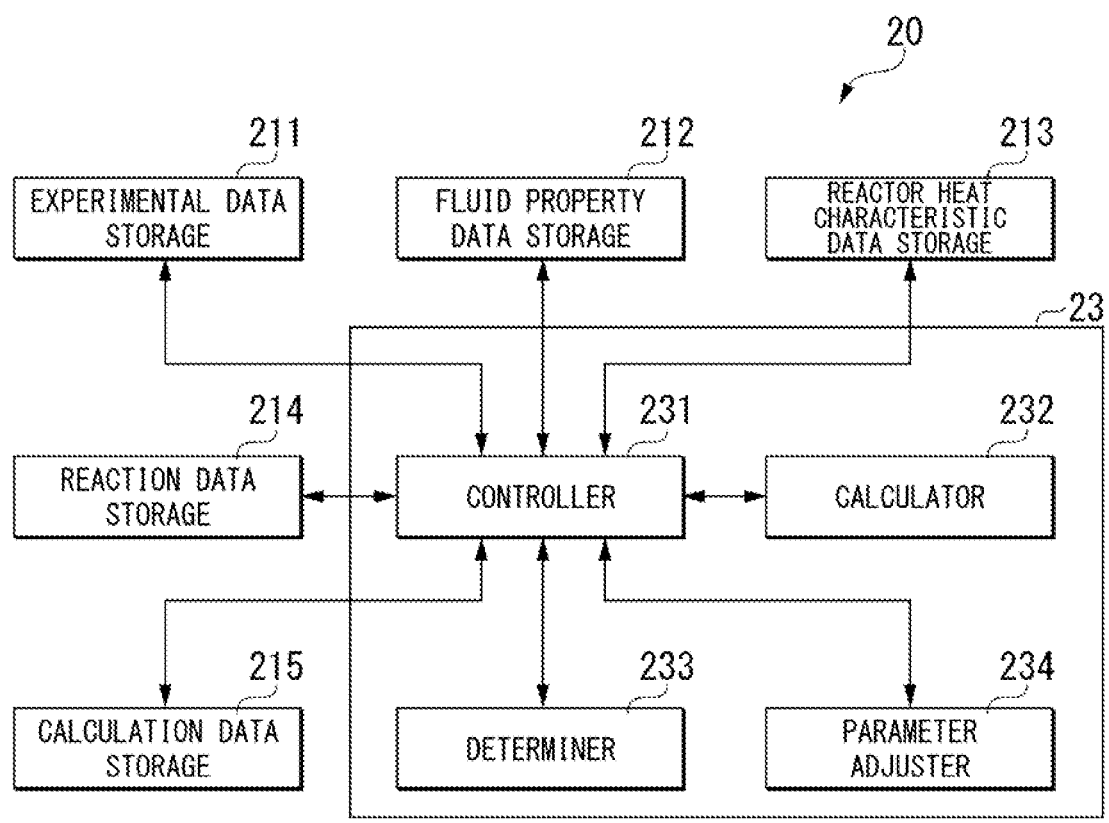
FIG. 7 is a diagram illustrating a connection example and a configuration example of the reaction analysis device according to the first embodiment.

FIG. 7 is a diagram illustrating a connection example and a configuration example of the reaction analysis device 20 according to the first embodiment. As shown in FIG. 7, the CPU 23 includes a controller 231, a calculator 232, a determiner 233, and a parameter adjuster 234. The experimental data storage 211, the fluid property data storage 212, the reactor heat characteristic data storage 213, the reaction data storage 214, and the calculation data storage 215 are connected to the controller 231.

The controller 231 allows the temperature measurer 16 to acquire the actual measured value of the temperature of a reaction fluid (the process of step S11 in FIG. 4). The controller 231 outputs the estimated reaction parameters $\Delta H$ and $\Delta G^{\ddagger}$ (or $E_a$) to the reaction data storage 214 (the process of step S15 in FIG. 4). In addition, the controller 231 may control the set temperature of the temperature regulator 15 (the temperatures of a reactant and a reaction fluid). In addition, the controller 231 may control the set flow rates of the first pump 11 and the second pump 12 (the flow rates of a reactant and a reaction fluid).

The calculator 232 calculates the temperature distribution calculation value $T_n(x)$ (the process of step S12 in FIG. 4). The calculator 232 calculates the concentration distribution $P(x)$ of a product and a reactant (the process of step S16 in FIG. 4).

The determiner 233 determines whether $T_n(x)$ approximately coincides with $T_0(x)$ by determining whether differences between the actual measured value of a temperature measured by the temperature measurer 16 and the estimated value of a temperature based on the temperature distribution calculation value $T_n(x)$ are all within a predetermined value stored by the host device (the process of step S13 in FIG. 4).

The parameter adjuster 234 adjusts the reaction parameters $\Delta H$ and $\Delta G^{\ddagger}$ (or $E_a$) (the process of step S14 in FIG. 4).

Meanwhile, the configuration shown in FIG. 6 and FIG. 7 is an example, and the present invention is not limited thereto. For example, the external storage device 21 may be connected to the internal storage device 22, the CPU 23, the input device 24, and the output device 25 through a network. In addition, each storage of the external storage device 21 may be included in the internal storage device 22.

<Function $T_n(x)$ Indicating Temperature Distribution>

Here, an example of how to obtain the function $T_n(x)$ indicating a temperature distribution will be described.

The CPU 23 solves and obtains the function $T_n(x)$ indicating a temperature distribution by approximating the following three expressions to, for example, a one-dimensional space. Meanwhile, at the time of approximation, the CPU 23 may solve and obtain the function by approximating the three expressions to, for example, a two-or-more-dimensional space.

The governing equation in a fluid simulation consists of three expressions: a mass preservation expression of the following Expression (6), a momentum preservation expression of the following Expression (7), and an energy preservation expression of the following Expression (8).

$$\frac{\partial \rho_s}{\partial t} + \nabla \cdot (\rho_s u) = -\nabla \cdot J + M_s \dot{\omega}_s \quad (6)$$

$$\frac{\partial (\rho u)}{\partial t} + \nabla \cdot (\rho u u + pI) = -\nabla \cdot V \quad (7)$$

$$\frac{\partial}{\partial t}\left[\rho\left(c_v T + \frac{1}{2}|u|^2\right)\right] + \nabla \cdot \left[\rho u\left(c_v T + \frac{1}{2}|u|^2\right)\right] =$$

$$\nabla \cdot (\lambda \nabla T) - \nabla \cdot (pu) - \nabla \cdot (T \cdot u) + \rho \sum_{s=1}^{N} h_s \dot{\omega}_s \quad (8)$$

In Expressions (6) to (8), $\rho_s$ is the density of chemical species s, u is the flow velocity vector of a reaction fluid, $M_s$ is the molecular weight of the chemical species s, $J_s$ is the diffusion mass flux of the chemical species s, $\dot{\omega}_s$ is the molar generation rate of the chemical species s, $\rho$ is the density of the reaction fluid, and p is the pressure of the reaction fluid. I is a unit tensor, V is a viscosity stress tensor, T is the temperature of the reaction fluid, $h_s$ is the generated molar enthalpy of the chemical species s, N is the number (type) of products, and cv is the specific heat at constant volume of the reaction fluid.

Meanwhile, in the above-described example, although an example in which the number of products obtained when the first reactant and the second reactant are mixed is one has been described, the number of products may be two or more.

In a case where the concentration of a reactant in the flow reactor, the concentration and yield of a product, and the reaction rate thereof are estimated using a method of the related art, it takes about one day to perform processing because of execution in a cut-and-dry manner.

According to the first embodiment, by measuring the temperature distribution of a reactor (flow reactor) having a flow path shape, it is possible to calculate reaction parameters such as activation free energy of chemical reaction in a short time without carrying out a plurality of experiments. According to the first embodiment, by performing a reaction simulation using the calculated reaction parameters, it is possible to analyze the generation rate and concentration of a product at any position during reaction even in a case where the operating conditions of a concentration, a temperature, or the like and the structure of a reactor are changed.

In addition, according to a first embodiment, by performing temperature measurement in front of and behind the mixer, it is also possible to cope with reaction proceeding from immediately after mixing.

In addition, according to the first embodiment, by using a fluid simulation including the law of conservation of momentum, it is also possible to cope with an object with a large change in flow velocity such as a gas in which the fluid itself becomes a reactant.

In addition, according to the first embodiment, by using the estimated reaction parameters, it is possible to estimate the concentration of a product at any position in a flow path shape in real time for about several seconds.

In addition, according to the first embodiment, since the concentration of a product at any position in a flow path shape can be estimated in real time for about several seconds, man-hours required for the optimization of reaction conditions can be reduced to about 1/100 or less of the related art. Meanwhile, since there are many parameters in the method of the related art, it is necessary to perform trial and error, so that a lot of man-hours are required.

In addition, according to the first embodiment, since man-hours such as concentration measurement or parameter calculation can be shortened, the efficiency of data acquisition for conditions which has been a problem in cheminformatics can be increased to about 100 times and thus high throughput can be achieved.

In addition, according to the first embodiment, conversion from the estimated concentration of a product at any position in a flow path shape into a yield also makes it possible to utilized for hardware design of a reactor such as optimum flow path length and thermal characteristics of the flow path inside diameter, flow path wall thickness, material quality, or the like of the reactor.

Here, regarding the yield, the yield at time t when one product P is produced from the first reactant A and the second reactant B is represented as in the following Expression (9).

$$\text{Yield }(t) = [P](t)/\min\{[A]_0, [B]_0\}\ldots \quad (9)$$

In the above expression, [P](t) is the concentration of a product P at time t, $[A]_0$ is the injection concentration of the first reactant A, $[B]_0$ is the injection concentration of the second reactant B, and min is a function for extracting a minimum value.

Application Examples

The reaction analysis system 1 of the first embodiment can be applied to, for example, the following device or system.

A first application example is a soft sensor for reaction monitoring. In this application example, the concentrations of a reactant and a product can be calculated from temperature measurement results in real time.

A second application example is a system that controls a chemical reaction by controlling operating conditions such as a temperature, a flow rate, the concentration of a material, or switching of a reaction flow path to be described later on the basis of output results of the soft sensor of the first application example. In this application example, it is possible to control a reaction while monitoring a reaction in-line in real time without sampling a reaction fluid and measuring the concentration of a product, or the like.

A third application example is a technique of producing active pharmaceutical ingredients of medical supplies or fine chemical-based functional materials using the reaction control system of the second application example. In this application example, it is possible to produce materials while monitoring a reaction fluid (reaction) in-line in real time without sampling the reaction fluid and measuring the concentration of a product, or the like.

Meanwhile, the above-described application examples are illustrative examples, and are not limited thereto. The reaction analysis system 1 may be applied to other systems, devices, processes, or the like.

The reaction analysis system 1 and the reaction analysis device 20 as described above can be applied not only to the flow reactor 10 in which the chemical reaction of a reaction fluid proceeds by mixing a plurality of reactants, but also to a flow reactor 10 shown in the following second embodiment.

Second Embodiment

Hereinafter, a second embodiment of the present invention will be described. In the following description, the same or equivalent components as or to those in the above-described embodiment are denoted by the same reference numerals and signs, and the description thereof will be simplified or omitted.

Figure 8:
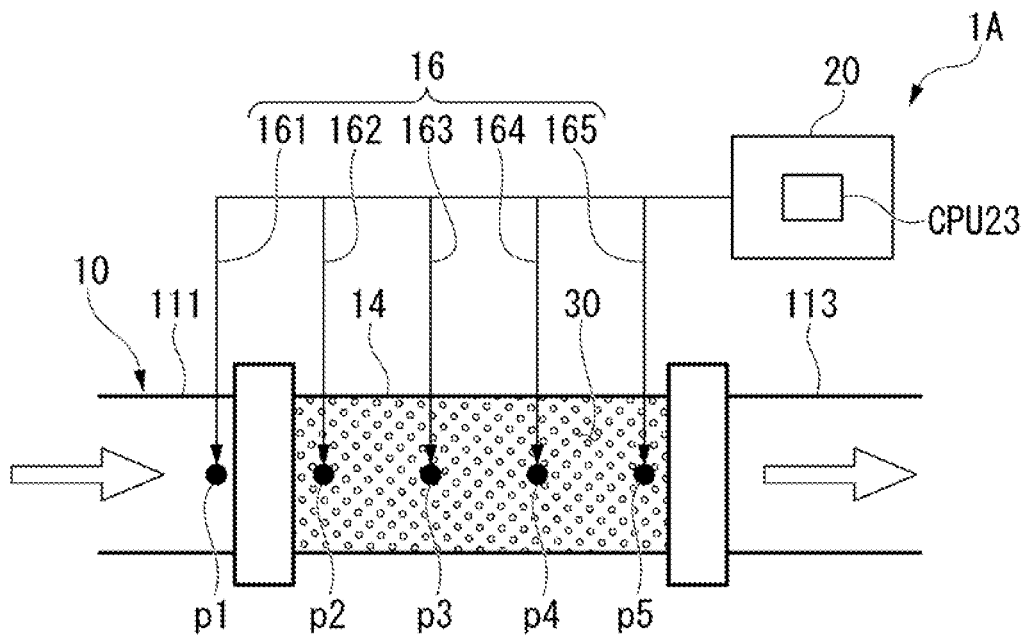
FIG. 8 is a block diagram illustrating a configuration example of a reaction analysis system according to a second embodiment.

FIG. 8 is a block diagram illustrating a configuration example of a reaction analysis system 1A according to the second embodiment. The reaction analysis system 1A shown in FIG. 8 includes the flow reactor 10 in which the chemical reaction of a reaction fluid proceeds through contact between a reaction fluid and a catalyst 30. The flow reactor 10 includes the liquid feeding tube 111, the reaction tube 14, a discharge tube 113, and the catalyst 30.

The catalyst 30 is received in the reaction tube 14. The reaction tube 14 includes one introduction port and one discharge port. The liquid feeding tube 111 is connected to the introduction port of the reaction tube 14. The discharge tube 113 is connected to the discharge port of the reaction tube 14.

The temperature measurer 16 includes a first temperature measurer 161 to a fifth temperature measurer 165. The first temperature measurer 161 is installed at a position p1 of the liquid feeding tube 111 upstream (before reaction) of the reaction tube 14. The second temperature measurer 162 to the fifth temperature measurer 165 are installed in the reaction tube 14 in the order of positions p2 to p5 along the flow of a reaction fluid. The second temperature measurer 162 to the fifth temperature measurer 165 can measure the temperature (temperature distribution) of the reaction fluid immediately after contact with the catalyst 30 (immediately after a reaction starts) in the flow direction of the reaction fluid.

The reaction analysis device 20 acquires information indicating a measured temperature which is output by the temperature measurer 16. The reaction analysis device 20 uses the acquired information indicating a temperature to specify the reaction state of the reaction fluid due to contact between the reaction fluid and the catalyst 30.

Figure 9:
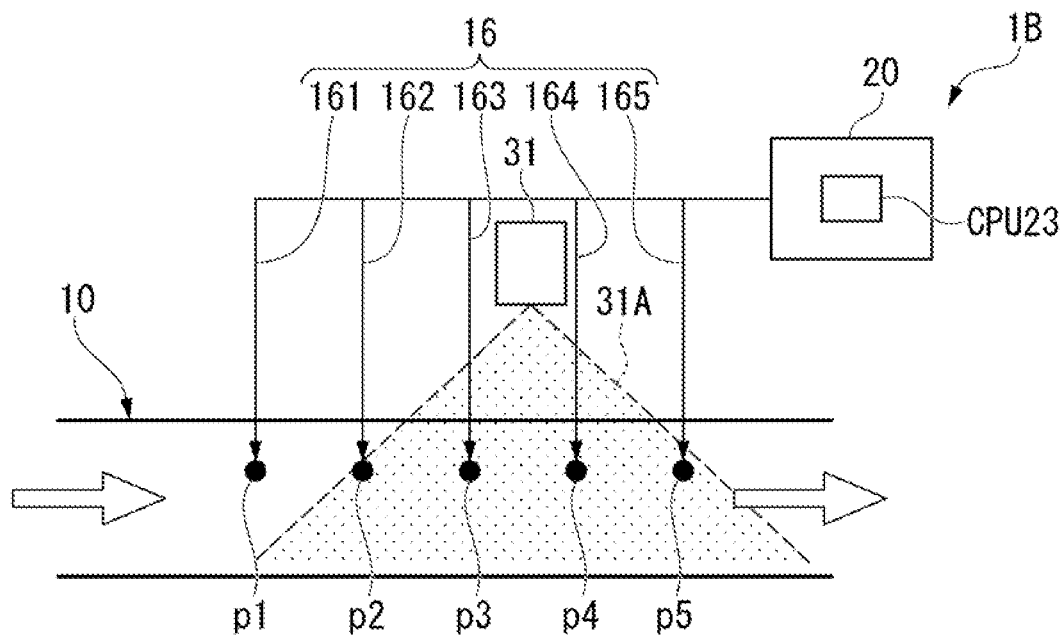
FIG. 9 is a block diagram illustrating a configuration example of a reaction analysis system according to a modification example of the second embodiment.

FIG. 9 is a block diagram illustrating a configuration example of a reaction analysis system 1B according to a modification example of the second embodiment.

The reaction analysis system 1B shown in FIG. 9 includes a flow reactor 10 in which the chemical reaction of a reaction fluid proceeds by radiating electromagnetic waves 31A to the reaction fluid. The reaction analysis system 1B includes an electromagnetic wave radiation device 31. The electromagnetic wave radiation device 31 radiates the electromagnetic waves 31A to the reaction flow path of the flow reactor 10.

The temperature measurer 16 includes the first temperature measurer 161 to the fifth temperature measurer 165. The first temperature measurer 161 is installed at the position p1 upstream (before reaction) of the range of radiation of the electromagnetic waves 31A. The second temperature measurer 162 to the fifth temperature measurer 165 are installed in the range of radiation of the electromagnetic waves 31A in the order of positions p2 to p5 along the flow of the reaction fluid. The second temperature measurer 162 to the fifth temperature measurer 165 can measure the temperature (temperature distribution) of the reaction fluid immediately after the radiation of the electromagnetic waves 31A (immediately after a reaction starts) in the flow direction of the reaction fluid.

The reaction analysis device 20 acquires information indicating a measured temperature which is output by the temperature measurer 16. The reaction analysis device 20 uses the acquired information indicating a temperature to specify the reaction state of the reaction fluid due to the radiation of the electromagnetic waves 31A to the reaction fluid.

Figure 10:
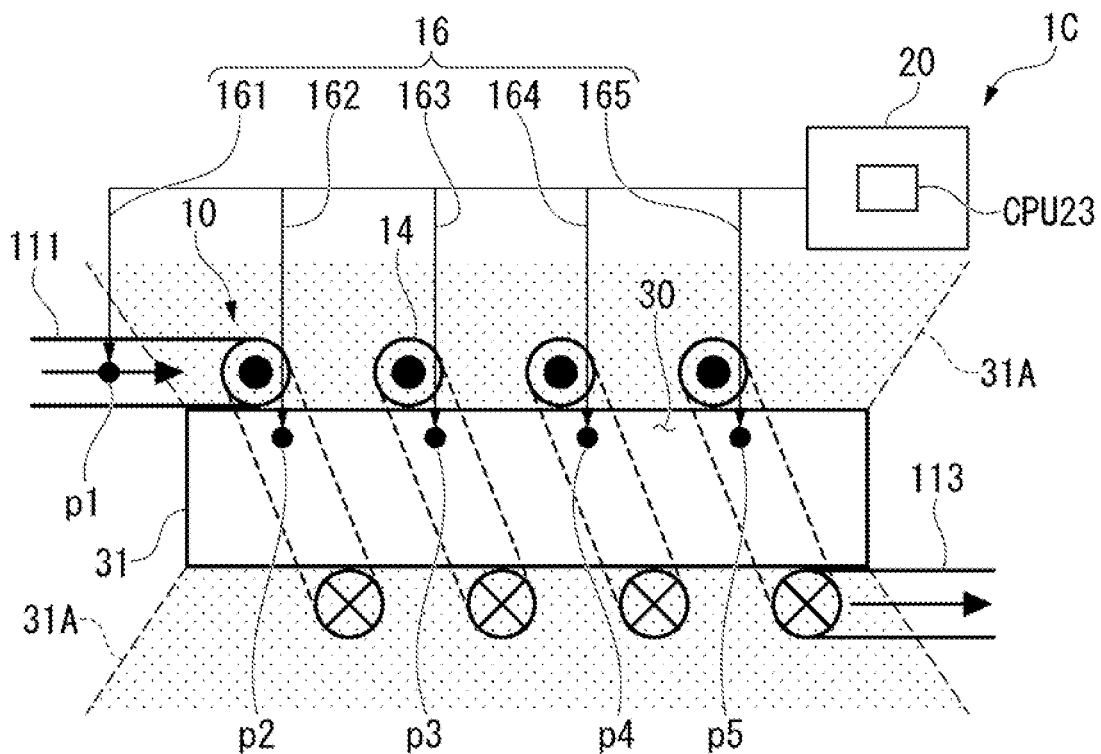
FIG. 10 is a block diagram illustrating a configuration example of a reaction analysis system according to a modification example of the second embodiment.

FIG. 10 is a block diagram illustrating a configuration example of a reaction analysis system 1C according to a modification example of the second embodiment.

Similarly to the reaction analysis system 1B shown in FIG. 9, the reaction analysis system 1C shown in FIG. 10 includes a flow reactor 10 in which the chemical reaction of a reaction fluid proceeds by radiating the electromagnetic waves 31A to the reaction fluid. The flow reactor 10 includes the liquid feeding tube 111, a spiral reaction tube 14, the discharge tube 113, and the electromagnetic wave radiation device 31.

The reaction tube 14 spirally orbits around the electromagnetic wave radiation device 31. The electromagnetic wave radiation device 31 radiates the electromagnetic waves 31A from the radial inner side of the spiral reaction tube 14 toward its outer side.

The temperature measurer 16 includes the first temperature measurer 161 to the fifth temperature measurer 165. The first temperature measurer 161 is installed at the position p1 of the liquid feeding tube 111 upstream (before reaction) of the range of radiation of the electromagnetic waves 31A. The second temperature measurer 162 to the fifth temperature measurer 165 are installed in the reaction tube 14 which is in the range of radiation of the electromagnetic waves 31A in the order of the positions p2 to p5 along the flow of the reaction fluid. The second temperature measurer 162 to the fifth temperature measurer 165 can measure the temperature (temperature distribution) of the reaction fluid immediately after the radiation of the electromagnetic waves 31A (immediately after a reaction starts) in the flow direction of the reaction fluid.

The reaction analysis device 20 acquires information indicating a measured temperature which is output by the temperature measurer 16. The reaction analysis device 20 uses the acquired information indicating a temperature to specify the reaction state of the reaction fluid due to the radiation of the electromagnetic waves 31A to the reaction fluid.

Figure 11:
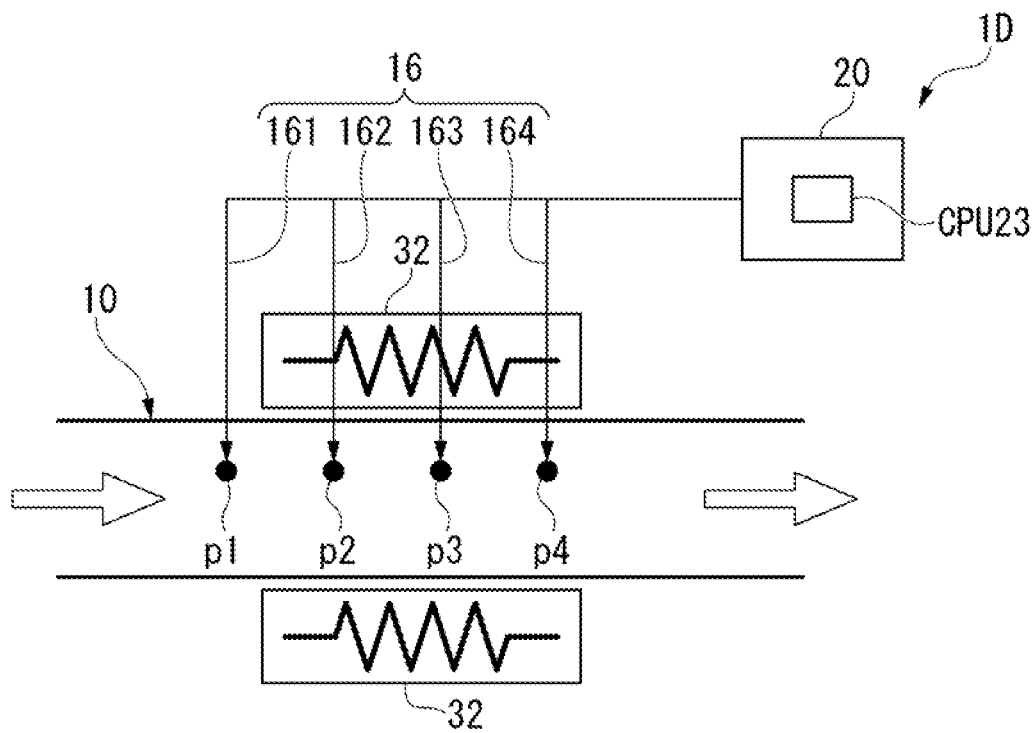
FIG. 11 is a block diagram illustrating a configuration example of a reaction analysis system according to a modification example of the second embodiment.

FIG. 11 is a block diagram illustrating a configuration example of a reaction analysis system 1D according to a modification example of the second embodiment.

The reaction analysis system 1D shown in FIG. 11 includes a flow reactor 10 in which the chemical reaction of a reaction fluid proceeds by heating the reaction fluid. The reaction analysis system 1D includes a heating device 32 (heater) that heats a reaction fluid flowing through the flow reactor 10. The heating device 32 is disposed along the reaction flow path of the flow reactor 10.

The temperature measurer 16 includes the first temperature measurer 161 to the fourth temperature measurer 164. The first temperature measurer 161 is installed at the position p1 upstream (before reaction) of a region opposite to the heating device 32. The second temperature measurer 162 to the fourth temperature measurer 164 are installed in a region opposite to the heating device 32 in the order of the positions p2 to p4 along the flow of the reaction fluid. The second temperature measurer 162 to the fourth temperature measurer 164 can measure the temperature (temperature distribution) of the reaction fluid immediately after heating (immediately after a reaction starts) in the flow direction of the reaction fluid.

The reaction analysis device 20 acquires information indicating a measured temperature which is output by the temperature measurer 16. The reaction analysis device 20 uses the acquired information indicating a temperature to specify the reaction state of the reaction fluid due to heating of the reaction fluid.

Figure 12:
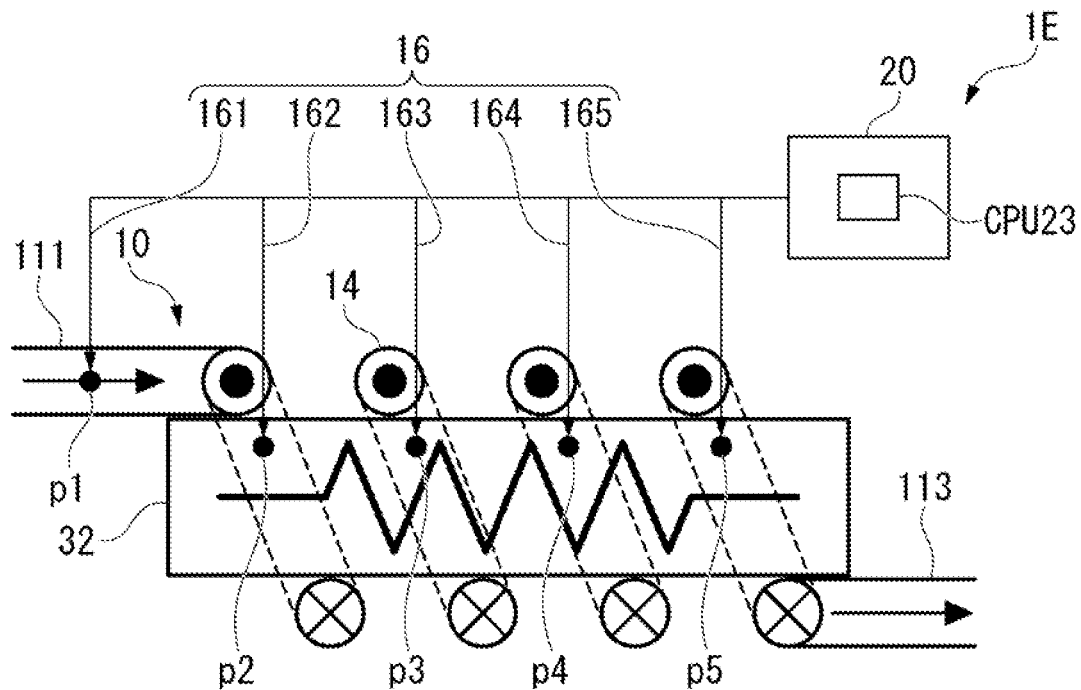
FIG. 12 is a block diagram illustrating a configuration example of a reaction analysis system according to a modification example of the second embodiment.

FIG. 12 is a block diagram illustrating a configuration example of a reaction analysis system 1E according to a modification example of the second embodiment.

Similarly to the reaction analysis system 1D shown in FIG. 11, the reaction analysis system 1E shown in FIG. 12 includes a flow reactor 10 in which the chemical reaction of a reaction fluid proceeds by heating the reaction fluid. The flow reactor 10 includes the liquid feeding tube 111, the spiral reaction tube 14, the discharge tube 113, and the heating device 32.

The reaction tube 14 spirally orbits around the heating device 32. The heating device 32 heats the spiral reaction tube 14 from the radial inner side.

The temperature measurer 16 includes the first temperature measurer 161 to the fifth temperature measurer 165. The first temperature measurer 161 is installed at the position p1 of the liquid feeding tube 111 upstream (before reaction) of the reaction tube 14. The second temperature measurer 162 to the fifth temperature measurer 165 are installed the reaction tube 14 which is a region opposite to the heating device 32 in the order of the positions p2 to p5 along the flow of the reaction fluid. The second temperature measurer 162 to the fifth temperature measurer 165 can measure the temperature (temperature distribution) of the reaction fluid immediately after heating (immediately after a reaction starts) in the flow direction of the reaction fluid.

The reaction analysis device 20 acquires information indicating a measured temperature which is output by the temperature measurer 16. The reaction analysis device 20 uses the acquired information indicating a temperature to specify the reaction state of the reaction fluid due to heating of the reaction fluid.

Figure 13:
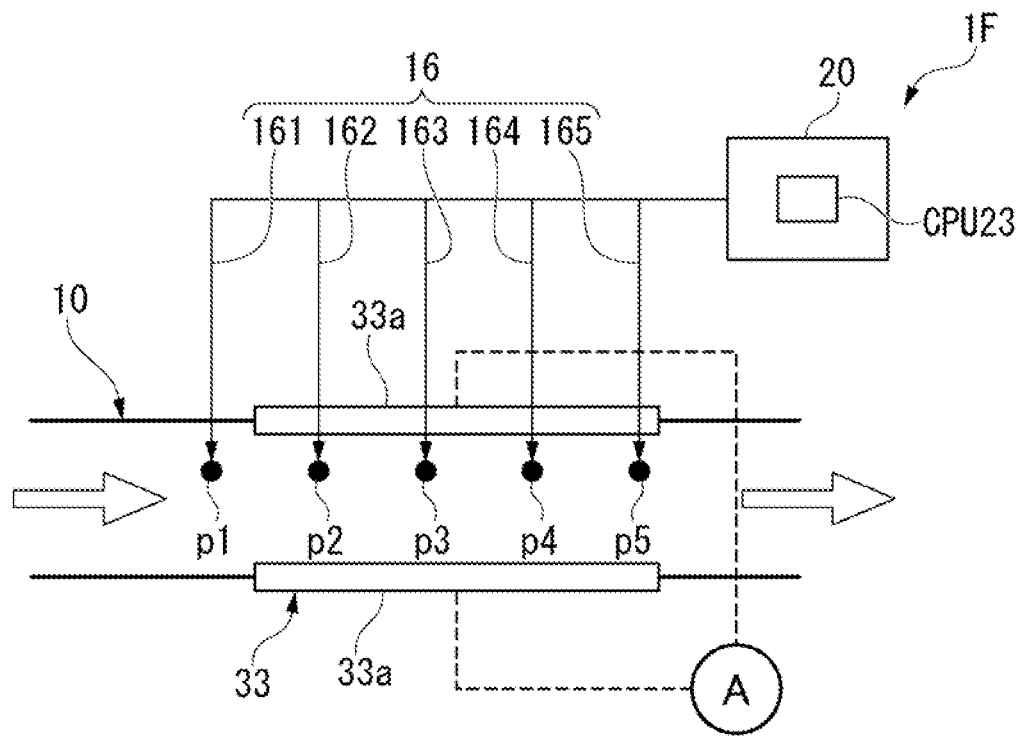
FIG. 13 is a block diagram illustrating a configuration example of a reaction analysis system according to a modification example of the second embodiment.

FIG. 13 is a block diagram illustrating a configuration example of a reaction analysis system 1F according to a modification example of the second embodiment.

The reaction analysis system 1F shown in FIG. 13 includes a flow reactor 10 in which the chemical reaction of a reaction fluid proceeds by electrifying a current to the reaction fluid. The reaction analysis system 1F includes an electrification device 33 that electrifies the reaction fluid flowing through the flow reactor 10. The electrification device 33 includes a pair of electrodes 33a disposed with the reaction flow path of the flow reactor 10 interposed therebetween.

The temperature measurer 16 includes the first temperature measurer 161 to the fifth temperature measurer 165. The first temperature measurer 161 is installed at the position p1 upstream (before reaction) of a region opposite to the pair of electrodes 33a. The second temperature measurer 162 to the fifth temperature measurer 165 are installed in a region opposite to the pair of electrodes 33a in the order of the positions p2 to p5 along the flow of the reaction fluid. The second temperature measurer 162 to the fifth temperature measurer 165 can measure the temperature (temperature distribution) of the reaction fluid immediately after electrification (immediately after a reaction starts) in the flow direction of the reaction fluid.

The reaction analysis device 20 acquires information indicating a measured temperature which is output by the temperature measurer 16. The reaction analysis device 20 uses the acquired information indicating a temperature to specify the reaction state of the reaction fluid due to the electrification of a current to the reaction fluid.

The reaction analysis system 1 (1A to 1F) and the reaction analysis device 20 described above can be applied not only to specifying the reaction state of a reaction fluid in various types of flow reactors 10, but also to controlling the reaction condition of the reaction fluid based on the estimated value of the specified reaction state (such as the estimation concentration of a reactant) as shown in the following third embodiment.

Third Embodiment

Hereinafter, a third embodiment of the present invention will be described. In the following description, the same or equivalent components as or to those in the above-described embodiment are denoted by the same reference numerals and signs, and the description thereof will be simplified or omitted.

Figure 14:
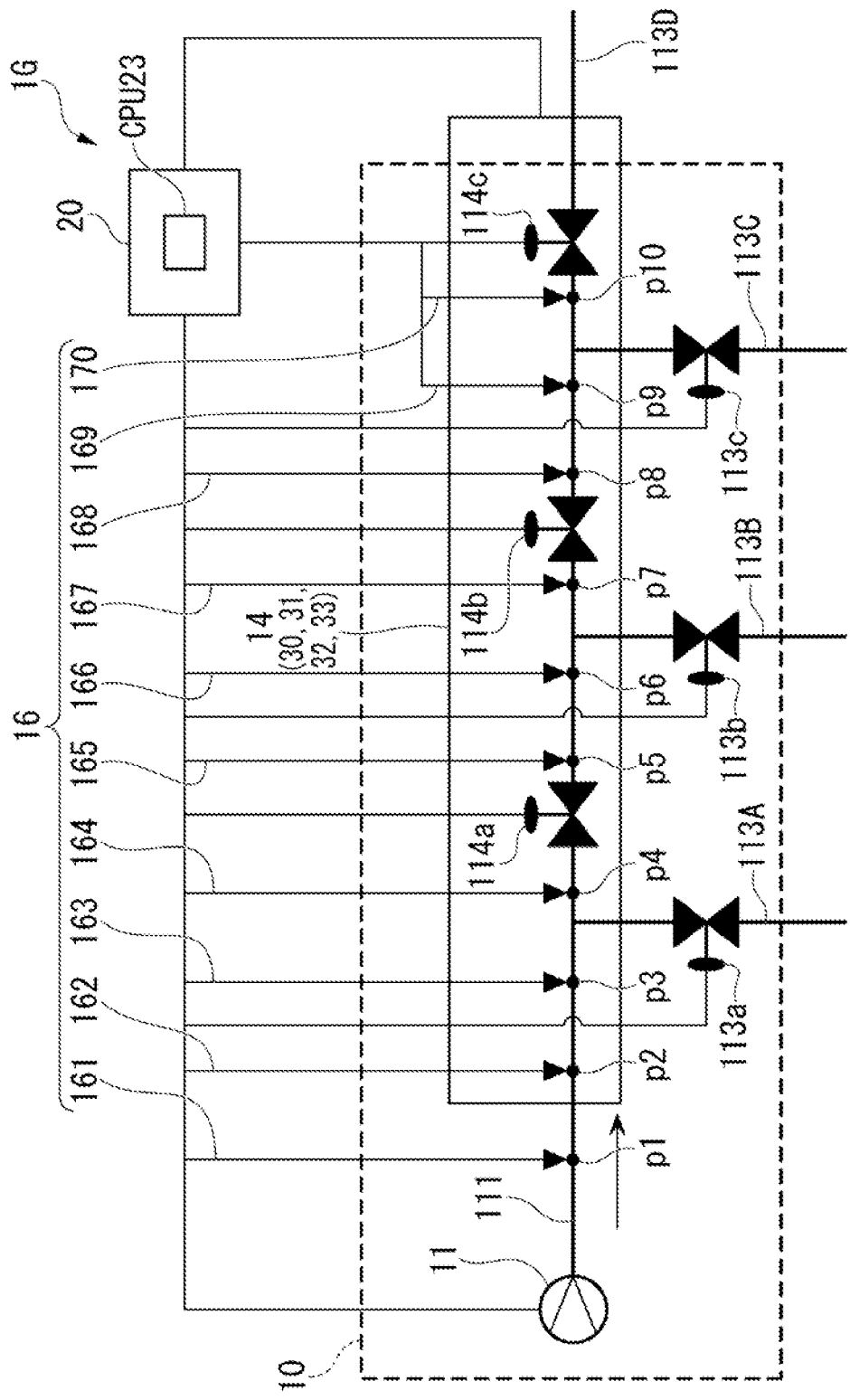
FIG. 14 is a block diagram illustrating a configuration example of a reaction analysis system according to a modification example of a third embodiment.

FIG. 14 is a block diagram illustrating a configuration example of a reaction analysis system 1G according to the third embodiment.

The reaction analysis system 1G shown in FIG. 14 includes the liquid feeding tube 111, the reaction tube 14, and a plurality of discharge tubes 113A to 113D. In addition, the reaction tube 14 is provided with any one of the catalyst 30, the electromagnetic wave radiation device 31, the heating device 32, and the electrification device 33 which are described above.

The temperature measurer 16 includes a first temperature measurer 161 to a tenth temperature measurer 170. The first temperature measurer 161 is installed at the position p1 of the liquid feeding tube 111 upstream (before reaction) of the reaction tube 14. The second temperature measurer 162 to the tenth temperature measurer 170 are installed in the reaction tube 14 in the order of positions p2 to p10 along the flow of the reaction fluid.

The reaction tube 14 is provided with a plurality of valves 114a to 114c. Specifically, the valve 114a is installed between the position p4 and the position p5. The valve 114b is installed between the position p7 and the position p8. The valve 114c is installed on the downstream side of the position p10.

The discharge tube 113A is located on the upstream side of the valve 114a of the reaction tube 14, and is connected between the position p3 and the position p4. A valve 113a is installed at the discharge tube 113A. The discharge tube 113B is located on the downstream side of the valve 114a of the reaction tube 14 and on the upstream side of the valve 114b, and is connected between the position p6 and the position p7. A valve 113b is installed at the discharge tube 113B.

The discharge tube 113C is located on the downstream side of the valve 114b of the reaction tube 14 and on the upstream side of the valve 114c, and is connected between the position p9 and the position p10. The valve 113b is installed at the discharge tube 113C. The discharge tube 113D is located on the downstream side of the valve 114c of the reaction tube 14, and is connected to the discharge port of the reaction tube 14.

The valves 113a to 113c and the valves 114a to 114c are connected to the reaction analysis device 20, and are controlled by the controller 231 (see FIG. 7 described above) to perform switching of the reaction flow path or adjustment of the flow rate of a reaction fluid. The controller 231 compares an estimated value indicating the specified reaction state of a reaction fluid with a predetermined target value, and controls the reaction condition of the reaction fluid in the flow reactor 10.

For example, in a case where the reaction tube 14 is provided with the catalyst 30, the reaction condition of a reaction fluid can be controlled by switching the reaction flow path in the flow reactor 10. Specifically, the reaction fluid is discharged from the discharge tube 113A by closing the valve 114a of the reaction tube 14 and opening the valve 113a of the discharge tube 113A, and thus it is possible to reduce a distance where the reaction fluid touches the catalyst 30 in the reaction tube 14. Similarly, it is possible to control the reaction condition of the reaction fluid by opening and closing the valves 113a to 113c and the valves 114a to 114c so that the reaction fluid is discharged from any one of the discharge tube 113A to the discharge tube 113D.

In addition, similarly, in a case where the reaction tube 14 is provided with any one of the electromagnetic wave radiation device 31, the heating device 32, and the electrification device 33, the reaction condition of the reaction fluid can be controlled by switching the reaction flow path in the flow reactor 10. Meanwhile, in the case of the electromagnetic wave radiation device 31, the heating device 32, and the electrification device 33, the reaction condition of the reaction fluid can be controlled without switching the reaction flow path. For example, in the case of the electromagnetic wave radiation device 31, the reaction condition can be controlled by moving an electromagnetic wave shield wall (not shown) to make the range of radiation of the electromagnetic waves 31A variable or make an output of radiation of electromagnetic waves variable. In addition, in the case of the heating device 32, the reaction condition can be controlled by making the heating temperature variable. In addition, in the case of the electrification device 33, the reaction condition can be controlled by making the amount of electrification variable.

Figure 15:
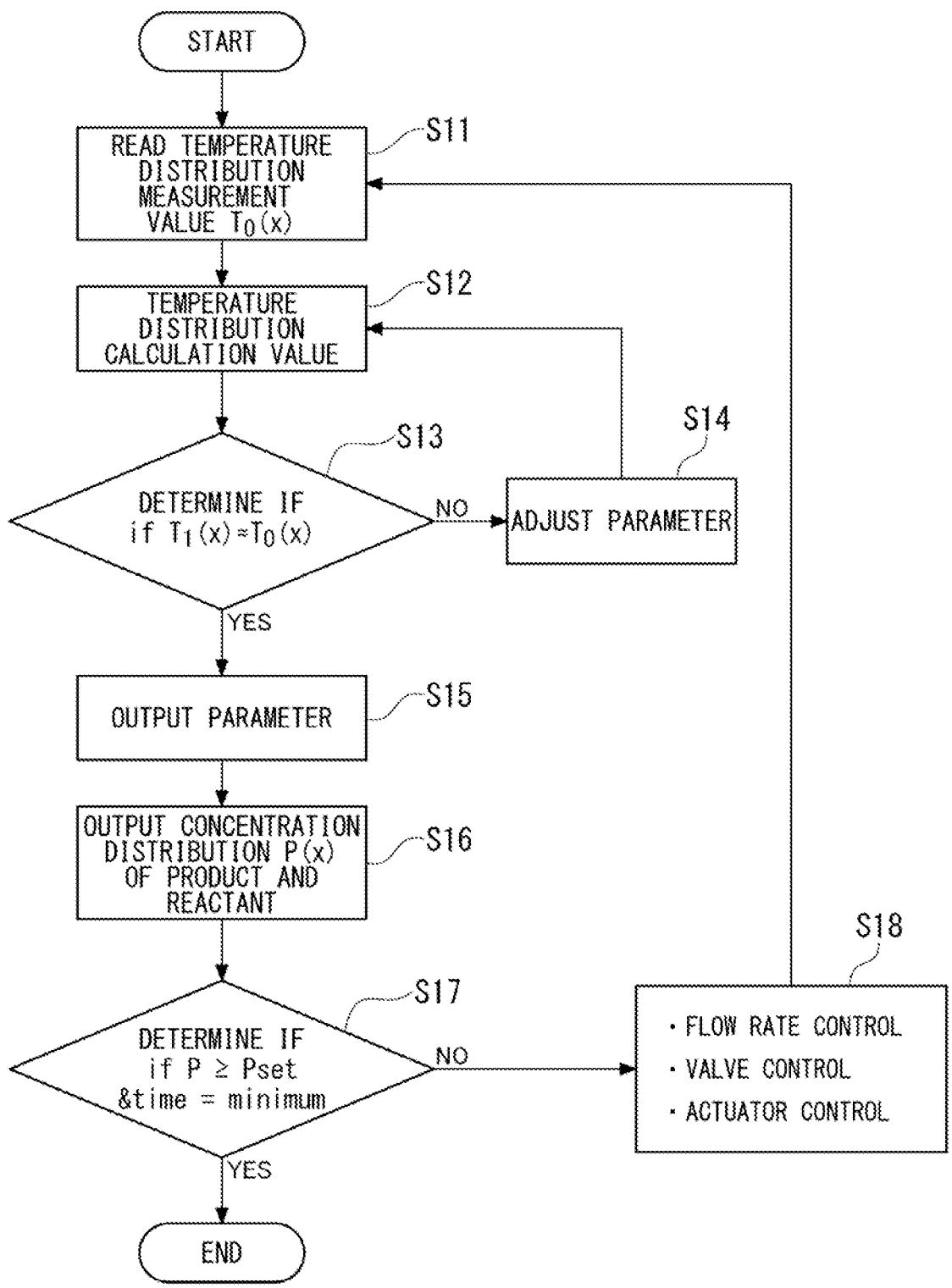
FIG. 15 is a flowchart illustrating a processing procedure of reaction condition control from a reaction analysis according to the third embodiment.
Figure 16:
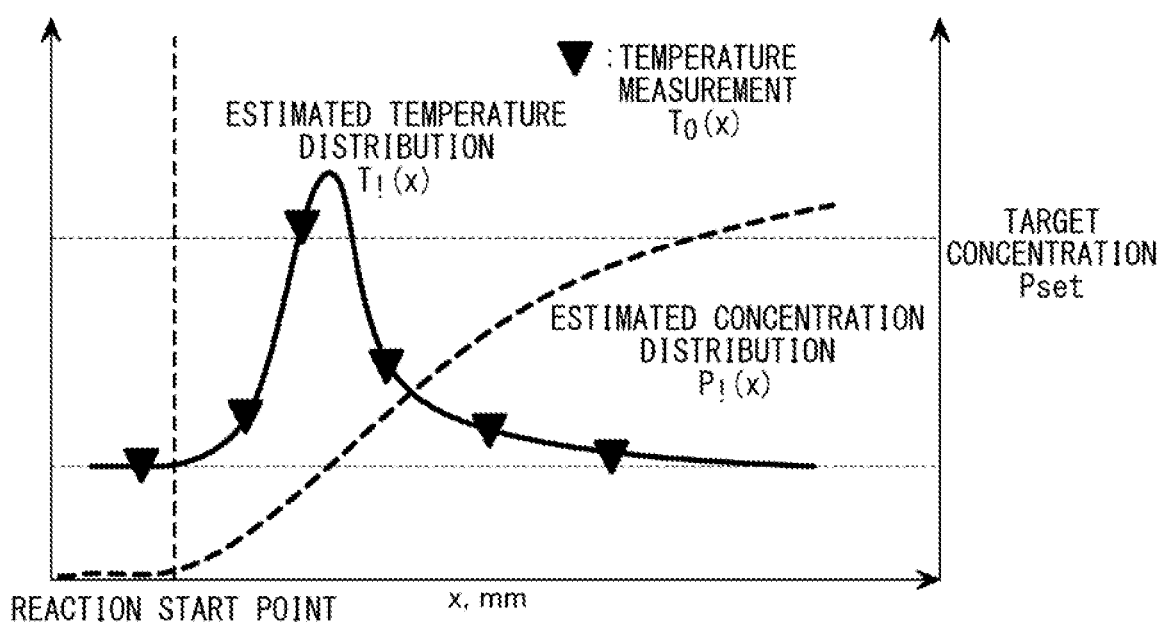
FIG. 16 is a diagram illustrating a relationship between a position and an estimated temperature, and a relationship between a position and an estimated concentration.

FIG. 15 is a flowchart illustrating a processing procedure of reaction condition control from a reaction analysis according to the third embodiment. FIG. 16 is a diagram illustrating a relationship between a position and an estimated temperature, and a relationship between a position and an estimated concentration.

The controller 231 controls the reaction condition of a reaction fluid in accordance with the flowchart shown in FIG. 15. Meanwhile, in the third embodiment, for the governing equation in a fluid simulation, an energy preservation expression shown in the following Expression (10) obtained by modifying Expression (8) described above is used.

$$\frac{\partial}{\partial t}\left[\rho\left(c_v T + \frac{1}{2}|u|^2\right)\right] + \nabla \cdot \left[\rho u\left(c_v T + \frac{1}{2}|u|^2\right)\right] = \nabla \cdot (\lambda \nabla T) - \nabla \cdot (pu) - \nabla \cdot (T \cdot u) + \rho \sum_{s=1}^{N} h_s \dot{\omega}_s + Q \quad (10)$$

Expression (10) is the addition of Q to Expression (8) described above. Q is represented by the following Expression (11) in a case where the chemical reaction of a reaction fluid proceeds by radiating electromagnetic waves to the reaction fluid in the flow reactor 10. In addition, Q is represented by the following Expression (12) in a case where the chemical reaction of a reaction fluid proceeds by electrifying a current to the reaction fluid in the flow reactor 10. In addition, Q is 0 (zero) in cases other than the above.

$$Q = f(\kappa, I) \ldots \quad (11)$$

$$Q = f(\sigma, i) \ldots \quad (12)$$

Expression (11) takes into account the generation of heat associated with radiation heat generation due to radiation of electromagnetic waves to a reaction fluid, where $\kappa$ is the absorption coefficient of radiation and I is an output of the electromagnetic wave radiation device 31. Meanwhile, it is only required that Expression (11) is strictly calculated from a radiation analysis or an electromagnetic field analysis. Expression (12) takes into account the electric heat generation due to electrification of a reaction fluid, where $\sigma$ is electric conductivity and i is a current value. Meanwhile, it is only required that Expression (12) is strictly calculated from an electromagnetic field analysis.

The flowchart shown in FIG. 15 is the addition of steps S17 and S18 to steps S11 to S16 shown in FIG. 4 described above. Thus, the description related to steps S11 to S16 will be omitted due to duplication.

(Step S17) The controller 231 obtains an estimated value P at the flow path outlet of the flow reactor 10 (x=the discharge port of the reaction tube 14) from the concentration distribution P(x) of a product and a reactant calculated in step S16, and determines whether the estimated value P is equal to or greater than a predetermined target value $P_{set}$. Further, it is determined whether the residence time of the reaction fluid to the flow path outlet of the flow reactor 10 after the estimated value P reaches the predetermined target value $P_{set}$ is minimum. In a case where the determination in step S17 is NO, the controller 231 transitions to step S18.

(Step S18) The controller 231 performs first control for setting the estimated value P at the flow path outlet of the flow reactor 10 to be equal to or greater than the target value $P_{set}$ and second control for minimizing the residence time of the reaction fluid to the flow path outlet of the flow reactor 10 after the estimated value P reaches the target value $P_{set}$. Meanwhile, the second control is control for suppressing a side reaction of the reaction fluid.

As a specific example of the first control, in a case where the estimated value P (estimated concentration) at the flow path outlet of the flow reactor 10 falls below the target value $P_{set}$ (target concentration) (in the case of P!(x)<$P_{set}$), the controller 231 controls the valves 114a to 114c, lowers the flow rate of the reaction fluid, and prolongs the residence time in the reaction flow path to extend the reaction time. In addition, for example, the controller 231 controls the valves 113a to 113c and the valves 114a to 114c, switches the reaction flow path, and prolongs the flow path length to extend the reaction time. In addition, for example, the controller 231 increases the output of actuators (the electromagnetic wave radiation device 31, the heating device 32, and the electrification device 33), increases the reactivity of the reaction fluid, and the like.

As a specific example of the second control, in a case where the residence time to flow path outlet of the flow reactor 10 after the estimated value P (estimated concentration) reaches the target value $P_{set}$ (target concentration) is long, the controller 231 controls the valves 114a to 114c, increases the flow rate of the reaction fluid, and shortens the residence time in the reaction flow path. In addition, for example, the controller 231 controls the valves 113a to 113c and the valves 114a to 114c, switches the reaction flow path, and reduces the flow path length to shorten the reaction time. In addition, for example, the controller 231 lowers the output of actuators (the electromagnetic wave radiation device 31, the heating device 32, and the electrification device 33) and lowers the reactivity of the reaction fluid to prolong a time to reach the target value $P_{set}$ (target concentration).

After step S18, the process returns to step S11, and the concentration distribution P(x) of a product and a reactant is obtained similarly to the above-described first embodiment. In a case where the determination of step S17 is YES, the process ends as an ideal reaction condition is obtained.

According to the third embodiment as described above, it is possible not only to specify the reaction state of the reaction fluid in various types of flow reactors 10, but also to control the reaction condition in the flow reactor 10 so that a reactant of a target concentration is obtained while suppressing a side reaction of the reaction fluid.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, in the embodiment, in order to ascertain the peak position of the temperature distribution of a reaction fluid, the peak position of the temperature distribution of the reaction fluid has been detected from a portion of the temperature measurer 16 (for example, the second temperature measurer 162 and the third temperature measurer 163 which are disposed so that the peak position of the temperature distribution of the reaction fluid are interposed therebetween). In this manner, the temperature measurers are provided at a plurality of locations in the reaction flow path of the flow reactor. However, in a case where it can be assumed in advance whether the peak position of the temperature distribution of the reaction fluid is located before or after a first temperature measurer, only the first temperature measurer may be provided. Specifically, this corresponds to a case where a first temperature measurer is installed near the reaction start point of the reaction fluid. In this case, when the flow velocity of the reaction fluid is sufficiently high, it is assumed that the temperature peak comes after the first temperature measurer. Therefore, even in a case where there is only one temperature measurer, an estimated temperature distribution can be obtained from the governing equation described above from the actual measurement result.

In addition, in the embodiment, the first control for setting the estimated value P at the flow path outlet of the flow reactor 10 to be equal to or greater than the target value $P_{set}$ and the second control for minimizing the residence time of the reaction fluid to the flow path outlet of the flow reactor 10 after the estimated value P reaches the target value $P_{set}$ are assumed to be performed in step S18 shown in FIG. 15. However, since the second control may not be necessary, only the first control may be performed.

[Supplementary Note]

According to an aspect of the present invention, there is provided a reaction analysis device that specifies a reaction state of a reaction fluid flowing through a flow reactor, the reaction analysis device may include a processor configured to specify the reaction state of the reaction fluid based on a reaction parameter indicating the reaction state of the reaction fluid which is obtained from a temperature distribution of the reaction fluid immediately after a reaction starts in a flow direction of the reaction fluid.

In addition, in the reaction analysis device according to an aspect of the present invention, the processor may acquire the reaction parameter by comparing an actual measurement result obtained by measuring a temperature of the reaction fluid with an estimated temperature distribution obtained by estimating the temperature distribution of the reaction fluid immediately after the reaction starts.

In addition, in the reaction analysis device according to an aspect of the present invention, the estimated temperature distribution may be obtained by a governing equation for estimating the temperature distribution of the reaction fluid immediately after the reaction starts, and the governing equation may have a first reaction parameter relevant to a peak value of the temperature distribution of the reaction fluid immediately after the reaction starts and a second reaction parameter relevant to a peak position of the temperature distribution of the reaction fluid immediately after the reaction starts.

In addition, in the reaction analysis device according to an aspect of the present invention, the first reaction parameter may indicate an amount of heat generation per unit substance amount, and the second reaction parameter may indicate temperature dependency of a reaction rate.

In addition, in the reaction analysis device according to an aspect of the present invention, the processor may adjust the first reaction parameter and the second reaction parameter so that a difference between the actual measurement result and the estimated temperature distribution is within a predetermined value, and store the first reaction parameter and the second reaction parameter which are adjusted in a storage.

In addition, in the reaction analysis device according to an aspect of the present invention, the processor may calculate at least one of the reaction rate of the reaction fluid, concentrations of a plurality of reactants, or a concentration or yield of a product included in the reaction fluid based on the first reaction parameter and the second reaction parameter which are stored in the storage.

In addition, the reaction analysis device according to an aspect of the present invention may further include a controller configured to compare the reaction state of the reaction fluid specified by the processor with a target value of the reaction state to control a reaction condition of the reaction fluid in the flow reactor.

In addition, in the reaction analysis device according to an aspect of the present invention, the controller may perform first control for setting the reaction state at a flow path outlet of the flow reactor to be equal to or greater than the target value.

In addition, in the reaction analysis device according to an aspect of the present invention, the controller may perform second control for minimizing a residence time of the reaction fluid to the flow path outlet of the flow reactor after the reaction state reaches the target value.

In order to achieve the above object, according to an aspect of the present invention, there is provided a reaction analysis system that specifies a reaction state of a reaction fluid flowing through a flow reactor, the reaction analysis system including: a temperature measurer configured to measure a temperature of the reaction fluid along a reaction flow path of the flow reactor; and the reaction analysis device described above, wherein the processor is configured to specify the reaction state of the reaction fluid based on a reaction parameter indicating the reaction state of the reaction fluid obtained from an actual measurement result obtained by the temperature measurer.

In addition, in the reaction analysis system according to an aspect of the present invention, the temperature measurer may be provided to interpose at least a peak position of the temperature distribution of the reaction fluid in the reaction flow path.

In addition, in the reaction analysis system according to an aspect of the present invention, the flow reactor may include: a plurality of supply flow paths configured to supply each of a plurality of reactants supplied to a chemical reaction; a mixer which is connected to the plurality of supply flow paths to mix the plurality of reactants; and a reaction flow path which is connected to the mixer and through which the reaction fluid obtained by mixing the plurality of reactants flows.

In addition, in the reaction analysis system according to an aspect of the present invention, the flow reactor may include a catalyst that promotes a chemical reaction of the reaction fluid.

In addition, the reaction analysis system according to an aspect of the present invention may further include an electromagnetic wave radiation device configured to radiate electromagnetic waves to the reaction fluid flowing through the flow reactor.

In addition, the reaction analysis system according to an aspect of the present invention may further include a heating device configured to heat the reaction fluid flowing through the flow reactor.

In addition, the reaction analysis system according to an aspect of the present invention may further include an electrification device configured to electrify the reaction fluid flowing through the flow reactor.

In order to achieve the above object, according to an aspect of the present invention, there is provided a reaction analysis method of specifying a reaction state of a reaction fluid flowing through a flow reactor, the reaction analysis method including: specifying, by a processor, the reaction state of the reaction fluid based on a reaction parameter indicating the reaction state of the reaction fluid which is obtained from a temperature distribution of the reaction fluid immediately after a reaction starts in a flow direction of the reaction fluid.

In addition, the reaction analysis method according to an aspect of the present invention may further include acquiring, by the processor, the reaction parameter by comparing an actual measurement result obtained by measuring a temperature of the reaction fluid with an estimated temperature distribution obtained by estimating the temperature distribution of the reaction fluid immediately after the reaction starts.

In addition, in the reaction analysis method according to an aspect of the present invention, the estimated temperature distribution may be obtained by a governing equation for estimating the temperature distribution of the reaction fluid immediately after the reaction starts, and the governing equation may have a first reaction parameter relevant to a peak value of the temperature distribution of the reaction fluid immediately after the reaction starts and a second reaction parameter relevant to a peak position of the temperature distribution of the reaction fluid immediately after the reaction starts.

In addition, in the reaction analysis method according to an aspect of the present invention, the first reaction parameter may indicate an amount of heat generation per unit substance amount, and the second reaction parameter may indicate temperature dependency of a reaction rate.

According to the present invention, it is possible to detect a reaction state such as a reaction rate in a shorter time than before without carrying out a plurality of experiments.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A reaction analysis device that specifies a reaction state of a reaction fluid flowing through a flow reactor, the reaction analysis device comprising:
   a processor configured to specify the reaction state of the reaction fluid based on a reaction parameter indicating the reaction state of the reaction fluid which is obtained from a temperature distribution of the reaction fluid immediately after a reaction starts in a flow direction of the reaction fluid,
   wherein the processor is configured to acquire the reaction parameter by comparing an actual measurement result obtained by measuring a temperature of the reaction fluid with an estimated temperature distribution obtained by estimating the temperature distribution of the reaction fluid immediately after the reaction starts,
   wherein the estimated temperature distribution is obtained by a governing equation for estimating the temperature distribution of the reaction fluid immediately after the reaction starts, and
   wherein the governing equation has a first reaction parameter that is relevant to a peak value of the temperature distribution of the reaction fluid immediately after the reaction starts and a second reaction parameter that is relevant to a peak position of the temperature distribution of the reaction fluid immediately after the reaction starts.

2. The reaction analysis device according to claim 1, wherein the first reaction parameter indicates an amount of heat generation per unit substance amount, and wherein the second reaction parameter indicates temperature dependency of a reaction rate.

3. The reaction analysis device according to claim 1, wherein the processor is configured to adjust the first reaction parameter and the second reaction parameter so that a difference between the actual measurement result and the estimated temperature distribution is within a predetermined value, and configured to store the first reaction parameter and the second reaction parameter which are adjusted in a storage.

4. The reaction analysis device according to claim 3, wherein the processor may calculate at least one of a reaction rate of the reaction fluid, concentrations of a plurality of reactants, or a concentration or yield of a product included in the reaction fluid based on the first reaction parameter and the second reaction parameter which are stored in the storage.

5. The reaction analysis device according to claim 1, further comprising:
a controller configured to compare the reaction state of the reaction fluid specified by the processor with a target value of the reaction state to control a reaction condition of the reaction fluid in the flow reactor.

6. The reaction analysis device according to claim 5, wherein the controller is configured to perform first control for setting the reaction state at a flow path outlet of the flow reactor to be equal to or greater than the target value.

7. A reaction analysis system comprising:
a temperature measurer configured to measure a temperature of the a reaction fluid along a reaction flow path of a flow reactor; and
the reaction analysis device according to claim 1,
wherein actual measurement result is obtained by the temperature measurer.

8. The reaction analysis system according to claim 7, wherein the temperature measurer is provided to interpose at least a-the peak position of the temperature distribution of the reaction fluid in the reaction flow path.

9. The reaction analysis system according to claim 7, wherein the flow reactor comprises:
a plurality of supply flow paths configured to supply each of a plurality of reactants supplied to a chemical reaction;
a mixer which is connected to the plurality of supply flow paths to mix the plurality of reactants; and
the reaction flow path which is connected to the mixer and through which the reaction fluid obtained by mixing the plurality of reactants.

10. The reaction analysis system according to claim 7, wherein the flow reactor comprises:
a catalyst that promotes a chemical reaction of the reaction fluid.

11. The reaction analysis system according to claim 7, further comprising:
an electromagnetic wave radiation device configured to radiate electromagnetic waves to the reaction fluid flowing through the flow reactor.

12. The reaction analysis system according to claim 7, further comprising:
a heating device configured to heat the reaction fluid flowing through the flow reactor.

13. The reaction analysis system according to claim 7, further comprising:
an electrification device configured to electrify the reaction fluid flowing through the flow reactor.

14. A reaction analysis device that specifies a reaction state of a reaction fluid flowing through a flow reactor, the reaction analysis device comprising:
a processor configured to specify the reaction state of the reaction fluid based on a reaction parameter indicating the reaction state of the reaction fluid which is obtained from a temperature distribution of the reaction fluid immediately after a reaction starts in a flow direction of the reaction fluid;
a controller configured to compare the reaction state of the reaction fluid specified by the processor with a target value of the reaction state to control a reaction condition of the reaction fluid in the flow reactor, to perform first control for setting the reaction state at a flow path outlet of the flow reactor to be equal to or greater than the target value, and
to perform second control for minimizing a residence time of the reaction fluid to the flow path outlet of the flow reactor after the reaction state reaches the target value.

15. A reaction analysis method of specifying a reaction state of a reaction fluid flowing through a flow reactor, the reaction analysis method comprising:
specifying, by a processor, the reaction state of the reaction fluid based on a reaction parameter indicating the reaction state of the reaction fluid which is obtained from a temperature distribution of the reaction fluid immediately after a reaction starts in a flow direction of the reaction fluid; and
acquiring, by the processor, the reaction parameter by comparing an actual measurement result obtained by measuring a temperature of the reaction fluid with an estimated temperature distribution obtained by estimating the temperature distribution of the reaction fluid immediately after the reaction starts,
wherein the estimated temperature distribution is obtained by a governing equation for estimating the temperature distribution of the reaction fluid immediately after the reaction starts, and
wherein the governing equation has a first reaction parameter that is relevant to a peak value of the temperature distribution of the reaction fluid immediately after the reaction starts and a second reaction parameter that is relevant to a peak position of the temperature distribution of the reaction fluid immediately after the reaction starts.

16. The reaction analysis method according to claim 15, wherein the first reaction parameter indicates an amount of heat generation per unit substance amount, and
wherein the second reaction parameter indicates temperature dependency of a reaction rate.

* * * * *